US011570629B2

(12) United States Patent
Haija et al.

(10) Patent No.: US 11,570,629 B2
(45) Date of Patent: Jan. 31, 2023

(54) SYSTEMS AND METHODS USING CONFIGURABLE SURFACES FOR WIRELESS COMMUNICATION

(71) Applicants: Ahmad Abu Al Haija, Ottawa (CA); Mohammadhadi Baligh, Ottawa (CA)

(72) Inventors: Ahmad Abu Al Haija, Ottawa (CA); Mohammadhadi Baligh, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 204 days.

(21) Appl. No.: 16/926,176

(22) Filed: Jul. 10, 2020

(65) Prior Publication Data

US 2022/0014935 A1  Jan. 13, 2022

(51) Int. Cl.
H04W 16/28 (2009.01)
H04L 5/00 (2006.01)
H04W 24/10 (2009.01)
H04B 17/336 (2015.01)
H04B 17/318 (2015.01)

(52) U.S. Cl.
CPC .......... *H04W 16/28* (2013.01); *H04B 17/318* (2015.01); *H04B 17/336* (2015.01); *H04L 5/0048* (2013.01); *H04W 24/10* (2013.01)

(58) Field of Classification Search
CPC ................ H04B 17/336; H04B 17/318; H04L 17/318; H04L 17/336; H04L 5/0048; H04W 16/28; H04W 24/10
See application file for complete search history.

(56) References Cited

U.S. PATENT DOCUMENTS

| 10,601,494 B2 | 3/2020 | Vannucci |
| 2018/0352590 A1 | 12/2018 | Sha et al. |
| 2020/0119878 A1 | 4/2020 | Jung et al. |
| 2021/0013619 A1* | 1/2021 | Alkhateeb ............ H01Q 15/148 |
| 2021/0344384 A1* | 11/2021 | Dunna .................... H01Q 3/32 |
| 2021/0384958 A1* | 12/2021 | Denis .................. H04B 7/0897 |
| 2022/0014329 A1* | 1/2022 | Qi ...................... H04W 72/046 |

FOREIGN PATENT DOCUMENTS

| WO | WO-2021109345 A1 * | 6/2021 |
| WO | WO-2022000408 A1 * | 1/2022 |

OTHER PUBLICATIONS

R4-1902278, Ericsson, CR to TS 38.141-2: Inclusion of subclause 4.8 reference in test procedures, 3GPP TSG-RAN WG4 Meeting #90, Athens, Greece Feb. 25-Mar. 1, 2019, total 3 pages.
(Continued)

*Primary Examiner* — David B Lugo

(57) ABSTRACT

Aspects of the present disclosure take advantage of a prism-like effect that occurs in a Reconfigurable Intelligent Surface (RIS), where the RIS reflects incident signals of different frequencies in different directions. for determining characteristics of a channel between a transmitter and a receiver wherein the channel includes the RIS. In particular, this may include estimating an angle of arrival (AoA) to the RIS in uplink transmission or the angle of departure (AoD) from the RIS in downlink transmission. Aspects of the present disclosure also provide solutions to compensate the prism effect for wideband transmission, especially at high frequencies (e.g. mmWave and THz).

22 Claims, 11 Drawing Sheets

(56) References Cited

OTHER PUBLICATIONS

Basar, Ertugrul, et al., "Wireless Communications Through Reconfigurable Intelligent Surfaces", Aug. 13, 2019, IEEE Access, vol. 7, pp. 116753-116773.

Xiong, Bo, et al., "Controlling the degrees of freedom in metasurface designs for multi-functional optical devices", Nanoscale Advances, Sep. 2019, vol. 1, pp. 3786-3806.

Nadeem, Qurrat-Ul-Ain, et al., "Intelligent Reflecting Surface Assisted Multi-User MISO Communication", May 6, 2020, IEEE Open Journal of the Communication Society, vol. 1, pp. 661-680.

Mishra, Deepak and Johansson, Håkan, "Channel Estimation and Low-complexity Beamforming Design for Passive Intelligent Surface Assisted MISO Wireless Energy Transfer," ICASSP 2019—2019 IEEE International Conference on Acoustics, Speech and Signal Processing (ICASSP), Brighton, United Kingdom, 2019, pp. 4659-4663.

Taha, Abdelrahman, et al., "Enabling Large Intelligent Surfaces with Compressive Sensing and Deep Learning", Apr. 30, 2019, Available Online: arXiv:1904.10136v2, https://arxiv.org/abs/1904.10136v2.

Ning, Boyu, et al., "Channel Estimation and Hybrid Beamforming for Reconfigurable Intelligent Surfaces Assisted THz Communications", Dec. 25, 2019, Available Online: arXiv:1912.11662v1, https://arxiv.org/abs/1912.11662v1.

Gao, Sheng, et al., "Tunable Liquid Crystal Based Phase Shifter with a Slot Unit Cell for Reconfigurable Reflectarrays in F-Band", Applied Sciences, 2018, vol. 8 Iss 12, Art. No 2528.

Yang, Jun, et al., "Reflective liquid crystal terahertz phase shifter with tuning range of over 360° ", IET Microwaves, Antennas & Propagation, 2018, vol. 12 Iss. 9, pp. 1466-1469.

Hum, Sean Victor and Perruisseau-Carrier, Julien, "Reconfigurable Reflectarrays and Array Lenses for Dynamic Antenna Beam Control: a Review", IEEE Transactions on Antennas and Propagation, Jan. 2014, vol. 62, No. 1, pp. 183-198.

Perez-Palomino, Gerardo, et al., "Design and Experimental Validation of Liquid Crystal-Based Reconfigurable Reflectarray Elements With Improved Bandwidth in F-Band," in IEEE Transactions on Antennas and Propagation, Apr. 2013, vol. 61, No. 4, pp. 1704-1713.

Fritzsch, Carsten, et al., "Continuously Tunable W-band Phase Shifter based on Liquid Crystals and MEMS Technology", Proceedings of the 6th European Microwave Integrated Circuits Conference, Oct. 2011, Manchester, UK, pp. 522-525.

Zhu, Dalin, et al., "High-Resolution Angle Tracking for Mobile Wideband Millimeter-Wave Systems With Antenna Array Calibration", IEEE Transactions on Wireless Communications, Nov. 2018, vol. 17, No. 11, pp. 7173-7189.

* cited by examiner

SYSTEMS AND METHODS USING CONFIGURABLE SURFACES FOR WIRELESS COMMUNICATION

TECHNICAL FIELD

The present disclosure relates generally to wireless communications, and in particular embodiments, use of configurable surfaces to reflect wireless signals between a transmitter and receiver.

BACKGROUND

In some wireless communication systems, user equipments (UEs) wirelessly communicate with a base station (or gNB) to send data to the base station and/or receive data from the base station. A wireless communication from a UE to a base station is referred to as an uplink (UL) communication. A wireless communication from a base station to a UE is referred to as a downlink (DL) communication. A wireless communication from a first UE to a second UE is referred to as a sidelink (SL) communication or device-to-device (D2D) communication.

Resources are required to perform uplink, downlink and sidelink communications. For example, a base station may wirelessly transmit data, such as a transport block (TB), to a UE in a downlink transmission at a particular frequency and over a particular duration of time. The frequency and time duration used are examples of resources.

For either uplink or downlink transmissions, beamforming is a technique that directs a wireless signal towards a particular receiving device, instead of allowing a signal to spread in a broader direction. Beamforming is an important aspect to the 5G networks. One technique for beamforming a signal involves utilizing multiple antennas in close proximity, all broadcasting a same signal at slightly different times. The overlapping transmitted waves produce interference that in some areas is constructive, making the signal stronger, and in other areas is destructive, making the signal weaker, or cancelling the signal.

SUMMARY

According to an aspect of the present disclosure, there is provided a method involving transmitting first configuration information to a user equipment (UE), the first configuration information identifying both a reference signal and a carrier frequency of the reference signal, the reference signal and carrier frequency being used to determine channel information about a channel between a base station and the UE via a reconfigurable intelligent surface (RIS). The method further including transmitting a reference signal that is redirected by the RIS based on second configuration information that configures the RIS to redirect different frequency components of the reference signal in different directions. The method also includes receiving measurement information from the UE pertaining to measurement of the reference signal redirected by the RIS and determining the channel information based on the transmitted reference signals and the received measurement information.

According to an aspect of the present disclosure, there is provided an apparatus that includes a processor and a computer-readable medium. The computer-readable medium has stored thereon computer executable instructions that when executed cause the processor to: transmit first configuration information to a UE, the first configuration information identifying both a reference signal and a carrier frequency of the reference signal, the reference signal and carrier frequency being used to determine channel information about a channel between a base station and the UE via a RIS; transmit a reference signal that is redirected by the RIS based on second configuration information that configures the RIS to redirect different frequency components of the reference signal in different directions; receive measurement information from the UE pertaining to measurement of the reference signal redirected by the RIS; and determine the channel information based on the transmitted reference signals and the received measurement information.

According to an aspect of the present disclosure, there is provided a method involving receiving, by a UE, configuration information, the configuration information identifying both a reference signal and a carrier frequency of the reference signal being used to determine channel information about a channel between a base station and the UE via a RIS. The method further involves receiving, by the UE, reference signal that has been redirected by the RIS and measuring, by the UE the received reference signals. The method further involves transmitting measurement information pertaining to measurement of the received reference signal.

In some embodiments, the UE further receives a data transmission that has been redirected by the RIS.

In some embodiments, the UE receives at least one of: one or more narrow frequency band reference signals that are redirected by the RIS in different directions such that reflected beams from the RIS are substantially non-overlapping; one or more narrow frequency band reference signals that are redirected by the RIS in different directions such that reflected beams from the RIS are overlapping; or a wide frequency band reference signal wherein frequency components of the wide frequency band reference signal are redirected by the RIS in different directions due to the prism-like effect of the RIS.

In some embodiments, the UE compensates for a multipath fading effect resulting from frequency components in a wide frequency band reference signal occupying a range of frequencies being redirected in different directions by the RIS by receiving an indication to perform channel equalization to compensate for the multipath fading effect.

In some embodiments, measuring the received reference signals comprises measuring at least one of a frequency response of a received wideband frequency band reference signal; reference signal received power (RSRP) for one or more reference signals; reference signal strength indicator (RSSI) for one or more reference signals; reference signal received quality (RSRQ) for one or more reference signals; or signal-to-noise ratio (SNR) for one or more reference signals.

In some embodiments, transmitting measurement information comprises transmitting at least one of: an identification of one or more reference signal with a received reference signal strength that satisfies a minimum threshold; a measurement of a reference signal received power (RSRP) for one or more reference signals; a measurement of a reference signal strength indicator (RSSI) for one or more reference signals; a measurement of a reference signal received quality (RSRQ) for one or more reference signals; a measurement of a signal to noise ratio (SNR) for one or more reference signals; or a frequency response of a received wideband frequency band reference signal.

In some embodiments, receiving the configuration information comprises receiving one or more of: an indication that the RIS is being used to redirect signaling to the UE; an indication of the type of RIS being used to redirect signaling to the UE; an identification of carrier frequencies that the reference signal is transmitted on; or an identification of the bandwidth of the reference signal.

According to an aspect of the present disclosure, there is provided an apparatus that includes a processor and a computer-readable medium. The computer-readable medium has stored thereon computer executable instructions that when executed cause the processor to: receive configuration information, the configuration information identifying both a reference signal and a carrier frequency of the reference signal being used to determine channel information about a channel between a base station and the UE via a reconfigurable intelligent surface (RIS); receive a reference signal that has been redirected by the RIS; measure the received reference signal; and transmit measurement information pertaining to measurement of the received reference signal.

According to an aspect of the present disclosure, there is provided a method involving receiving, by a RIS, first configuration information to configure the RIS to redirect different frequency components of a reference signal in different directions. The method further involves receiving a reference signal from a transmitter and redirecting the received reference signal based on the first configuration information to a receiver.

In some embodiments, the method further includes receiving, by the RIS, second configuration information to configure the RIS to redirect a data transmission in an appropriate direction when a data transmission interacts with the RIS.

In some embodiments, the method further includes at least one of: receiving the data transmission from the transmitter; or redirecting the received data transmission in a direction of the receiver based on the second configuration information.

In some embodiments, the receiving reference signals comprises receiving at least one of one or more narrow frequency band reference signals that are redirected by the RIS in different directions such that reflected beams from the RIS are substantially non-overlapping; one or more narrow frequency band reference signals that are redirected by the RIS in different directions such that reflected beams from the RIS are overlapping; and a wide frequency band reference signal wherein frequency components of the wide frequency band reference signal are redirected by the RIS in different directions due to the prism-like effect of the RIS.

In some embodiments, the method further includes compensating for a multipath fading effect that would result from frequency components in a wideband reference signal occupying a range of frequencies being redirected in different directions by the RIS by configuring the RIS to reduce the deviation from a main desired direction.

In some embodiments, configuring the RIS to reduce the deviation from the main desired direction comprises configuring the RIS with third configuration information comprising configuration information for at least one of: configuring the RIS to redirect a wide frequency band data signal transmitted in a wide beam that is larger than a deviation caused by a prism-like effect; configuring that RIS to divide the RIS into separate portions, each portion redirecting a subset of a wide frequency band data signal incident on the RIS; and configuring the RIS so that different sets of one or more configurable elements of the RIS redirect the wide frequency band data signal incident on the RIS in a desired direction by having the configurable elements on one end of the RIS configured to redirect a lowest frequency component of the wide frequency band data signal in the desired direction and then configuration of other configurable elements of the RIS gradually changing such that at the other end of the RIS, the configurable elements are configured to redirect a highest frequency of the wide frequency band data signal in the desired direction.

In some embodiments receiving the first configuration information comprises receiving one or more of: carrier frequencies that the reference signals are transmitted on; an AoA of the reference signal at the RIS for downlink transmissions; one or more assumed AoD of the reference signal from the RIS when the reference signal is redirected for downlink transmissions; one or more assumed AoA of the reference signal at the RIS for uplink transmissions; an AoD of the reference signal from the RIS when the reference signal is redirected for uplink transmissions; beam-width via which the signal is redirected; and partitioning of the RIS to redirect reference signals of different frequencies.

According to an aspect of the present disclosure, there is provided an apparatus that includes a processor and a computer-readable medium. The computer-readable medium has stored thereon computer executable instructions that when executed cause the processor to: receive configuration information, the configuration information to configure the RIS to redirect different frequency components of a reference signal in different directions; receive a reference signal from a transmitter; and redirect the received reference signal based on the configuration information to a receiver.

In addition to methods described above, that generally pertain to downlink channel estimation and data transmission on the channel including an RIS, aspects of the disclosure can also be applied to uplink channel estimation and data transmission on the channel including an RIS and to sidelink channel estimation and data transmission on the channel including an RIS.

Additional aspect of the disclosure also include devices such as base stations, user equipment, and RIS in accordance with embodiments enclosed herewith.

In some embodiments of the disclosure, using a planar array of configurable elements, such as a RIS, in the path of a communication link between a base station and a user equipment to redirect transmissions, allows the RIS to reflect in multiple directions either intentionally, such as when a narrow frequency band is used or due to deviation of some frequency components when a wide frequency band signal is used. Simultaneous reflection is actually helpful as it reduces a beam sweeping process that is performed at the receiver. Furthermore, for some materials used in RIS, such as liquid crystal, a response time between a bias voltage being applied to the elements in the in the RIS and the elements completing being reconfigured, is long in order to reconfigure the RIS to reflect to another direction. Hence, reduction in overhead resulting from the simultaneous reflection helps provide time to reconfigure the RIS.

Furthermore, in the case of wideband transmission, the base station informs the UE about the use of the RIS in the communication channel. This is because the RIS makes the channel appear as a multipath fading channel despite that at high frequency, the channel is usually flat and less scattered. The channel appears as a multipath fading channel because frequencies within the wideband transmission may be redirected in somewhat different directions due to a prism-like effect that will be described in greater detail below.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

Figure 1:
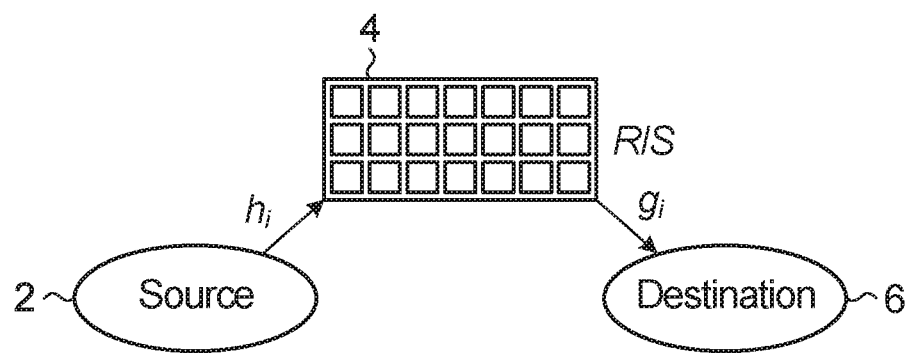
FIG. 1 is a schematic diagram of a transmission channel between a source and destination in which a planner array of configurable elements is used to redirect signals according to an aspect of the disclosure.

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

A Reconfigurable Intelligent Surface (RIS), also known as large intelligent surface (LIS), smart reflect-array, intelligent passive mirrors, artificial radio space, reconfigurable metasurface, holographic multiple input multiple output (MIMO) is an array of configurable elements. These configurable elements may be also known as metamaterial cells or unit cells. A metamaterial (which may also be referred to as a Beyond-Material) is a material that is engineered to change its properties in order to manipulate amplitude and/or phase of a wave incident on the metamaterial. Manipulation of the amplitude and/or phase can be achieved by changing an impedance or relative permittivity (and/or permeability) of the metamaterial. At low frequencies, the impedance is controlled through lumped elements like PIN diodes, varactors, transistors or microelectromechanical system (MEMS). At higher frequencies, the relative permittivity and/or permeability of the material element (like liquid crystal at high frequencies and graphene at even higher frequencies) changes its permittivity in accordance to changes in a bias voltage provided to the material. Consequently, the phase of the signal redirected by the material is changed in accordance with the change in permittivity. As the bias voltages involved for these materials are quite low, the materials are often referred to as passive phase shifters.

In some discussions in this disclosure, RIS devices may be referred as a set of configurable elements arranged in a linear array or a planar array. Nevertheless, the analysis and discussions are extendable to other two or three dimensional arrangements (e.g., circular array). A linear array is a vector of N configurable elements and a planar array is a matrix of N×M configurable elements. These configurable elements have the ability to redirect a wave/signal that is incident on the linear or planar array by changing the phase of the wave/signal. The configurable elements are also capable of changing the amplitude, polarization, or even the frequency of the wave/signal. In some planar arrays these changes occur as a result of changing bias voltages that controls the individual configurable elements of the array via a control circuit connected to the linear or planar array. The control circuit that enables control of the linear or planar array may be connected to a communications network that base stations and UEs communicating with each other are part of. For example, the network that controls the base station may also provide configuration information to the linear or planar array. Control methods other than bias voltage control include, but are not limited to, mechanical deformation and phase change materials.

Because of their ability to manipulate the incident wave, the low cost of these types of devices, and because these types of devices require small bias voltages, RIS have recently received heightened research interest in the area of wireless communication as a valuable tool for beamforming and/or modulating communication signals. A basic example for RIS utilization in beamforming is shown in FIG. 1 where each RIS configurable element (unit cell) can change the phase of the incident wave from source such that the reflected waves from all of the RIS elements are aligned to the direction of the destination to increase or maximize its received signal strength (e.g. maximize the SNR). Such a reflection via the RIS may be referred to as reflect-array beamforming.

While there has been some research performed using RIS in the channel path between a transmitter and receiver, this research has not considered a prism-like effect that occurs in practical implementation of the RIS. The prism-like effect occurs because of the RIS's characteristics defining a relation between phase shift, frequency and the controlling method, for example bias voltage and results in the RIS's redirecting incident signals at different frequencies in different directions. From an optics perspective, a prism is a dispersive element used to separate white light into its constituent spectral wavelengths. In this instance, prism-like effect is being used to describe when different frequencies of an incident communications beam, having a same angle of arrival (AoA), impinge on an RIS, have different angles of departure (AoD) for a same bias voltage. Such an effect has been utilized in RIS for optical applications such as —multi-color imaging and meta-lenses.

For a same applied bias voltage used to control the elements of the RIS, the phase shift that occurs to an incident wave is different at different frequencies. However, the phase shift difference at different applied bias voltages is not necessarily a linear phase shift. For example, for a given RIS, when the applied bias voltage is 1.1 volts, the phase shift is approximately 50 degrees at a frequency of 125 GHz and is approximately 275 degrees at a frequency of 130 GHz. However, when applying 1.5 volts, the phase shift is approximately 225 degrees at a frequency of 125 GHz and approximately 360 degrees at 130 GHz.

In some implementations of RIS a linear relation between phase-shift and frequency, for the range of applied voltages, may be achievable, but this would come at a cost of a narrow bandwidth in which the linear relationship occurs. For example, at a practical 100 GHz operational frequency range, a linear relationship between phase-shift, frequency, and applied voltage might be about 4 GHz, which would not be particularly useful at that operational frequency range. It is worth noting that the first order derivative of phase-shift with respect to the frequency is called group delay. Only a linear relationship between phase-shift and frequency guarantees a constant group delay which would result in no separation of beams for different frequencies.

The present disclosure provides methods and devices that provide a level of compensation for the prism-like effect of the RIS described above, where the RIS reflects incident signals of different frequencies in different directions. This effect is more obvious at high frequencies, such as sub-THz bands due to a large transmission bandwidth that is typically used at these frequencies. This prism-like effect may also cause interference and multipath fading effects at the receiver. The present application also provides new configuration signaling among devices in a communication network utilizing the RIS and configuration for the RIS.

Aspects of the present disclosure take advantage of the prism-like effect described above for determining characteristics of the channel wherein the channel includes the RIS. In particular, this may include estimating the AoA to the RIS in uplink transmission or the AoD from the RIS in downlink transmission. Aspects of the present disclosure provides solutions to compensate the prism effect for wideband transmission, especially at high frequencies (e.g. mmWave and THz). Aspects of the present disclosure provides the new signaling associated with the prism effect in estimation and transmission process.

FIG. 1 illustrates an example of a planar array of configurable elements, labelled in the figure as RIS 4, in a channel between a source 2, or transmitter, and a destination 6, or receiver. The channel between the source 2 and destination 6 include a channel between the source 2 and RIS 4 identified as $h_i$ and a channel between the RIS 4 and destination 6 identified as $g_i$, for the $i^{th}$ RIS configurable element (RIS unit cell) where $i \in \{1, 2, 3, \ldots, N*M\}$ assuming the RIS consists of N*M elements or unit cells. A wave that leaves the source 2 and arrives at the RIS 4 can be said to be arriving with a particular AoA. When the wave is reflected or redirected by the RIS 4, the wave can be considered to be leaving the RIS 4 with a particular AoD.

While FIG. 1 having the two dimensional planar array RIS 4 shows a channel $h_i$ and a channel $g_i$, the figure does explicitly show an elevation angle and azimuth angle of the transmission from the source 2 to RIS 4 and the elevation angle and azimuth angle of the redirected transmission from the RIS 4 to the destination 6. In the case of a linear array, there may be only one angle to be concerned about, i.e. the azimuth angle.

In wireless communications, the RIS 4 can be deployed as 1) a reflector between a transmitter and a receiver, as shown in FIG. 1, or as 2) a transmitter (integrated at the transmitter) to help implement a virtual MIMO system as the RIS helps to direct the signal from a feeding antenna.

Figure 2:
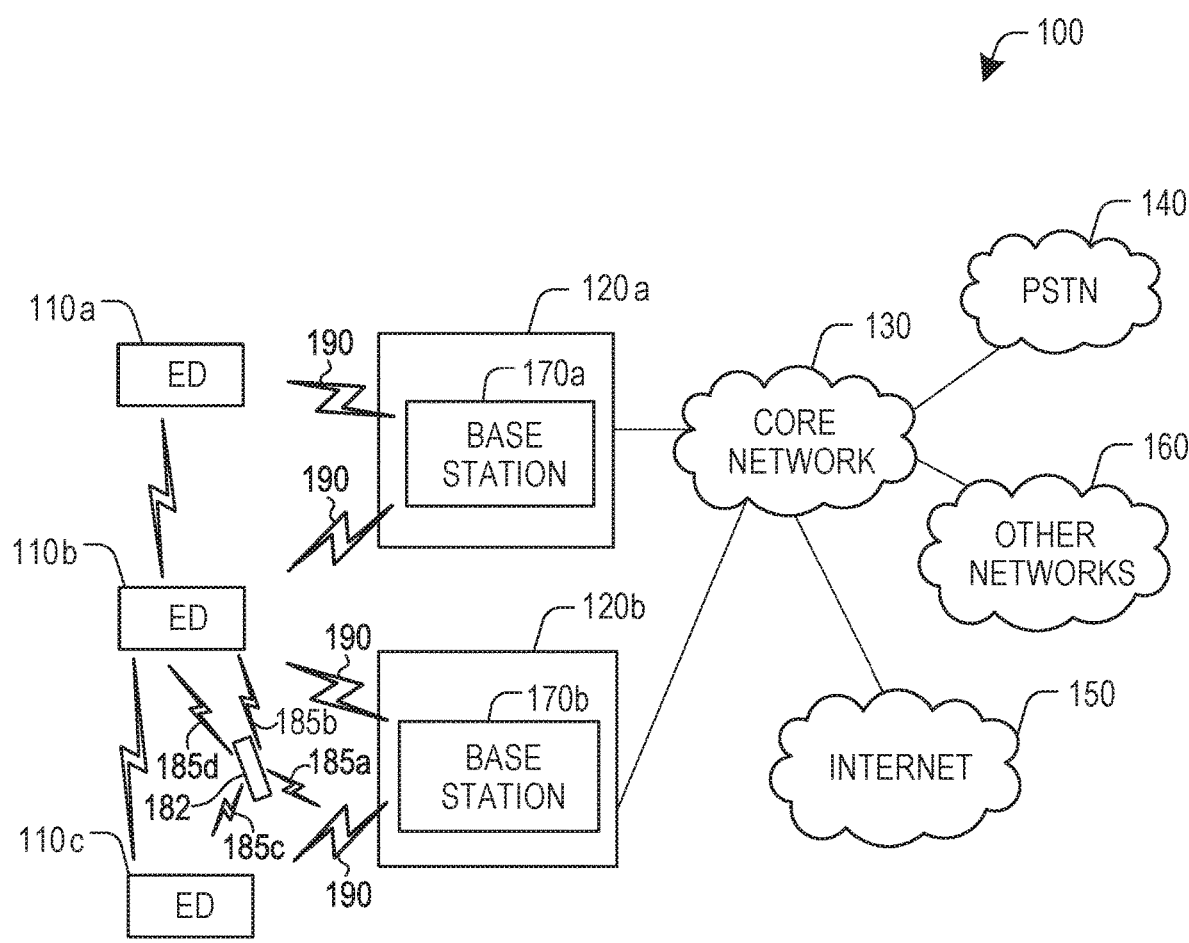
FIG. 2 is a schematic diagram of a communication system in which embodiments of the disclosure may occur.
Figure 3A:
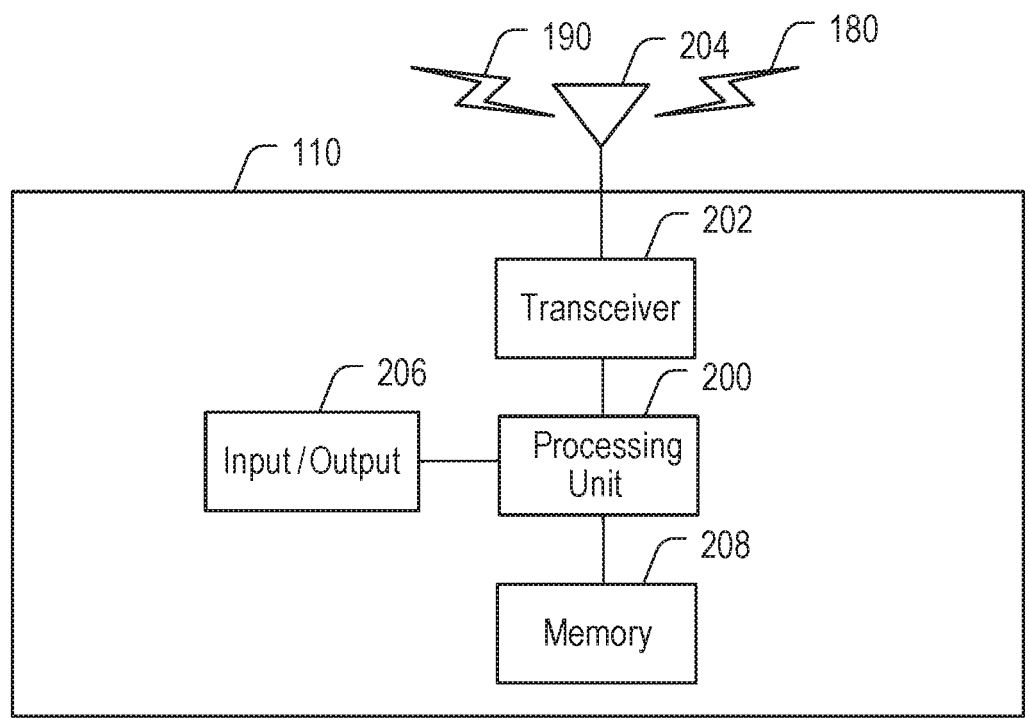
FIGS. 3A, 3B and 3C are block diagrams of an example user equipment, base station and RIS, respectively.
Figure 3B:
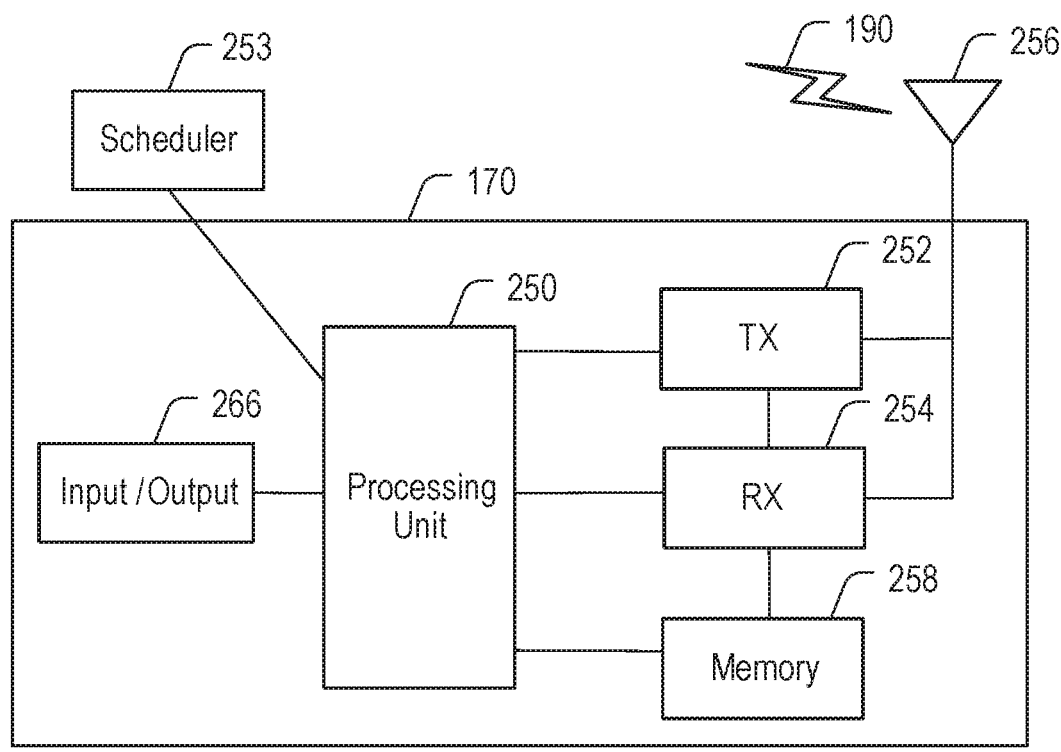

FIGS. 2, 3A, and 3B following below provide context for the network and device that may be in the network and that may implement aspects of the present disclosure.

FIG. 2 illustrates an example communication system 100 in which embodiments of the present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In this example, the communication system 100 includes electronic devices (ED) 110a-110c, radio access networks (RANs) 120a-120b, a core network 130, a public switched telephone network (PSTN) 140, the Internet 150, and other networks 160. While certain numbers of these components or elements are shown in FIG. 2, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device.

FIG. 2 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, multicast, unicast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 2, any reasonable number of these components or elements may be included in the communication system 100.

The EDs 110a-110c are configured to operate, communicate, or both, in the communication system 100. For example, the EDs 110a-110c are configured to transmit, receive, or both, via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 2, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding.

The EDs 110a-110c and base stations 170a-170b are examples of communication equipment that can be configured to implement some or all of the functionality and/or embodiments described herein. In the embodiment shown in FIG. 2, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as High Speed Packet Access (HSPA), Evolved HPSA (HSPA+) optionally including High Speed Downlink Packet Access (HSDPA), High Speed Packet Uplink Access (HSUPA) or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160).

The EDs 110a-110c communicate with one another over one or more SL air interfaces 180 using wireless communication links e.g. radio frequency (RF), microwave, infrared (IR), etc. The SL air interfaces 180 may utilize any suitable radio access technology, and may be substantially similar to the air interfaces 190 over which the EDs 110a-110c communication with one or more of the base stations 170a-170c, or they may be substantially different. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the SL air interfaces 180. In some embodiments, the SL air interfaces 180 may be, at least in part, implemented over unlicensed spectrum.

In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110a-110c may be multimode devices capable of operation according to multiple radio access technologies, and incorporate multiple transceivers necessary to support multiple radio access technologies.

Also shown in FIG. 2 is a RIS 182 located within the serving area of base station 170b. A first signal 185a is shown between the base station 170b and the RIS 182 and a second signal 185b is shown between the RIS 182 and the ED 110b, illustrating how the RIS 182 might be located within the uplink or downlink channel between the base station 170b and the ED 110b. Also shown is a third signal 185c between the ED 110c and the RIS 182 and a fourth signal 185d is shown between the RIS 182 and the ED 110b, illustrating how the RIS 182 might be located within the SL channel between the ED 110c and the ED 110b.

While only one RIS 182 is shown in FIG. 2, it is to be understood that any number of RIS could be included in a network.

FIGS. 3A and 3B illustrate example devices that may implement the methods and teachings according to this disclosure. In particular, FIG. 3A illustrates an example ED 110, and FIG. 3B illustrates an example base station 170. These components could be used in the system 100 or in any other suitable system.

As shown in FIG. 3A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Figure 3C:
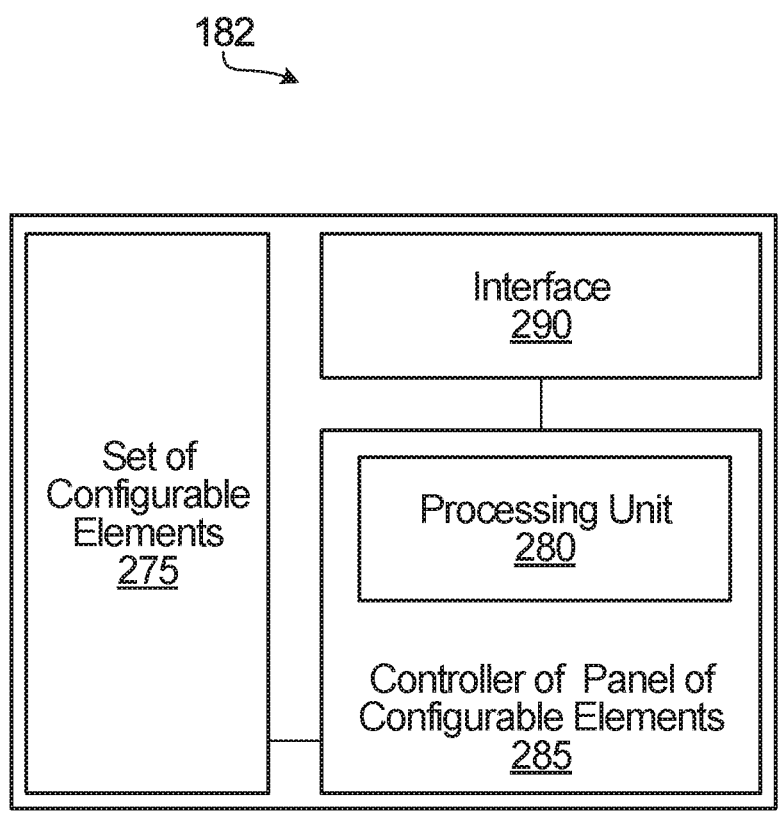

FIG. 3C illustrates an example RIS device that may implement the methods and teachings according to this disclosure. In particular, FIG. 3C illustrates an example RIS 182. These components could be used in the system 100 or in any other suitable system.

As shown in FIG. 3C, the RIS 182 includes a controller 285 that includes at least one processing unit 280, an interface 290, and a set of configurable elements 275.

The processing unit 280 implements various processing operations of the RIS 182, such as receiving the configuration signal via interface 290 and providing the signal to the controller 285. The processing unit 280 could, for example, include a microprocessor, microcontroller, digital signal processor, field programmable gate array, or application specific integrated circuit.

While this is a particular example of an RIS, it should be understood that the RIS may take different forms and be implemented in different manner than shown in FIG. 3C. The RIS 182 ultimately needs a set of configurable elements that can be configured as described to operate herein.

While FIG. 3C shows an interface to receive configuration information from the network, if in embodiments when an antenna or a sensor were to be connected to the RIS, it may be considered a separate element from the RIS.

Additional details regarding the UEs 110 and the base stations 170 are known to those of skill in the art. As such, these details are omitted here for clarity.

A practical implementation of a RIS and some methods for channel estimation and rate maximization of channel settings resulting from the use of the RIS will be described.

As explained above, the phase shifts that occur due to the configurable elements of the RIS depend on the frequency of the incident wave in addition to the bias voltage used to control the RIS. The following description explains how such phenomena can impact a reflected signal from the RIS between a transmitter and a receiver.

Depending on the type of material used in the RIS, a range of phase shift can be obtained within a particular bias voltage range for a first frequency, but a similar range of phase shift for a second frequency may need a different bias voltage range having different start and end voltages. In a particular type of RIS material, at a frequency of 121.5 GHz, almost the full range of the phase shift is obtained with the voltage range between 1.6 volt and 2.7 volt while other applied voltages cause almost a constant phase shift. However, at a frequency of 126 GHz, almost the full range of the phase shift is obtained with the voltage range between 1 volt and 1.6 volt. Hence, for this type of RIS, a different and separate range of bias voltages need to be applied at different frequencies in order to obtain the required phase shift. This is more evident when the difference between the frequencies is a large difference.

Figure 4A:
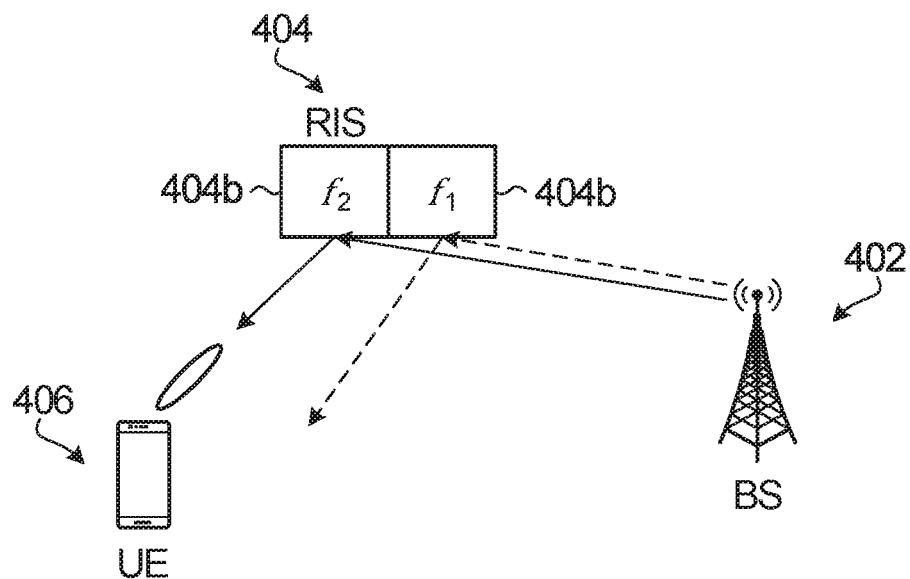
FIG. 4A is a schematic diagram illustrating a RIS configured to redirect transmission signals for two different frequencies transmitted by the base station in two different directions.

Referring to the arrangement of FIG. 1, according to some embodiments of the present disclosure, the planer array of configurable elements (RIS) 4 located between the source 2 and destination 6 can be operated such that different portions of the planar array are configured with different bias voltages such that each portion is configured to redirect a particular frequency in a particular direction, while having a marginal impact for the signals at other frequencies. In a particular example, when the AoA=0 degrees, and the AoD is unknown, the RIS can be divided into multiple parts (e.g. 2) where each part is configured assuming different assumed AoD. For the sake of discussion, an assumed AoD of 25 degrees for a frequency of 120 GHz and an assumed AoD of 40 degrees for a frequency of 128 GHz. A representation of this is shown in FIG. 4A, where the AoA can be seen to be the same for the signals arriving at the RIS 404 from the base station 402. The RIS 404 is shown to be divided into two portions 404a and 404b. Portion 404a is configured with a bias voltage to redirect f1=120 GHz with an assumed AoD of 25 degrees and portion 404b is configured with a bias voltage to redirect f2=128 GHz with an assumed AoD of 40 degrees. When the base station 402 transmits signals of different frequencies (f1 and f2), or one wideband signal that includes both frequencies, a normalized RIS gain is maximized at the assumed AoD that is close to a real AoD as shown in FIG. 4B.

Figure 4B:
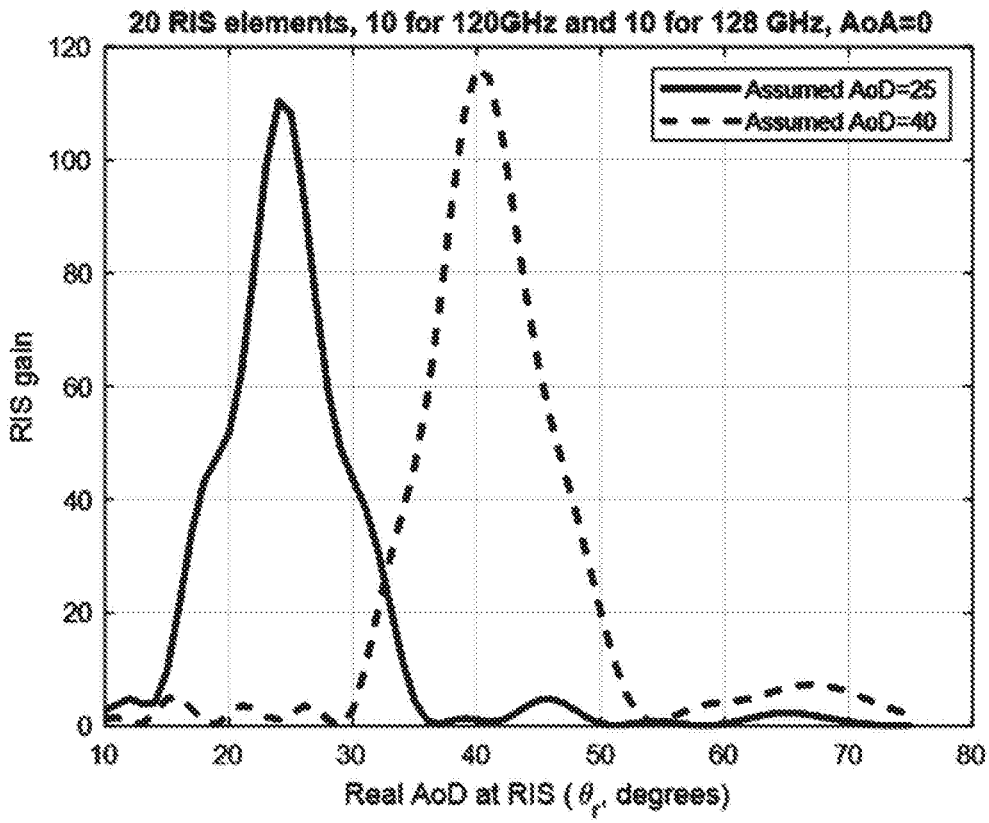
FIG. 4B is a graphical plot illustrating angles of departure (AoD) for two different frequency signals being redirected by the RIS configured as in FIG. 4A.

FIG. 4B is a simulation for determining a real AoD at the RIS for signals that are transmitted at the base station 402 at frequencies of 120 GHz and 128 GHz, where the AoA is 0 degrees and the assumed AoDs for signals at those frequencies are 25 degrees and 40 degrees, respectively. In this simulation the RIS 404 is 20 RIS elements in length and is divided so that 10 elements of the overall length are configured to redirect the 120 GHZ signal and 10 elements of the overall length are configured to redirect the 128 GHZ signal. A maximum gain is associated with a specific frequency or a frequency sub-band when a wideband signal is transmitted. A normalized RIS gain can be determined by dividing a real RIS gain by a gain of each RIS element and by the signal to noise ratio (SNR), where the SNR=$G_T G_R E_T / N_0$, where $G_T$ is the transmitter's (base station 402) gain, $G_R$ is the receiver's (UE 406) gain, $E_T$ is the transmit energy, and $N_0$ is the noise variance.

If the first and second frequencies are relatively close (e.g., 124 GHz and 125 GHz), then using a same set of bias voltages on two portions of the RIS will not result in a significant phase shift to signals at these frequencies. However, a same set of bias voltages can affect different frequencies of a range of frequencies quite differently, resulting in different group delays at particular frequencies of the range of frequencies. The group delay is considered as the derivation of the phase shift with respect to the frequency. Consequently, a wideband signal reflected by the RIS will experience a multipath fading effect.

Figure 5A:
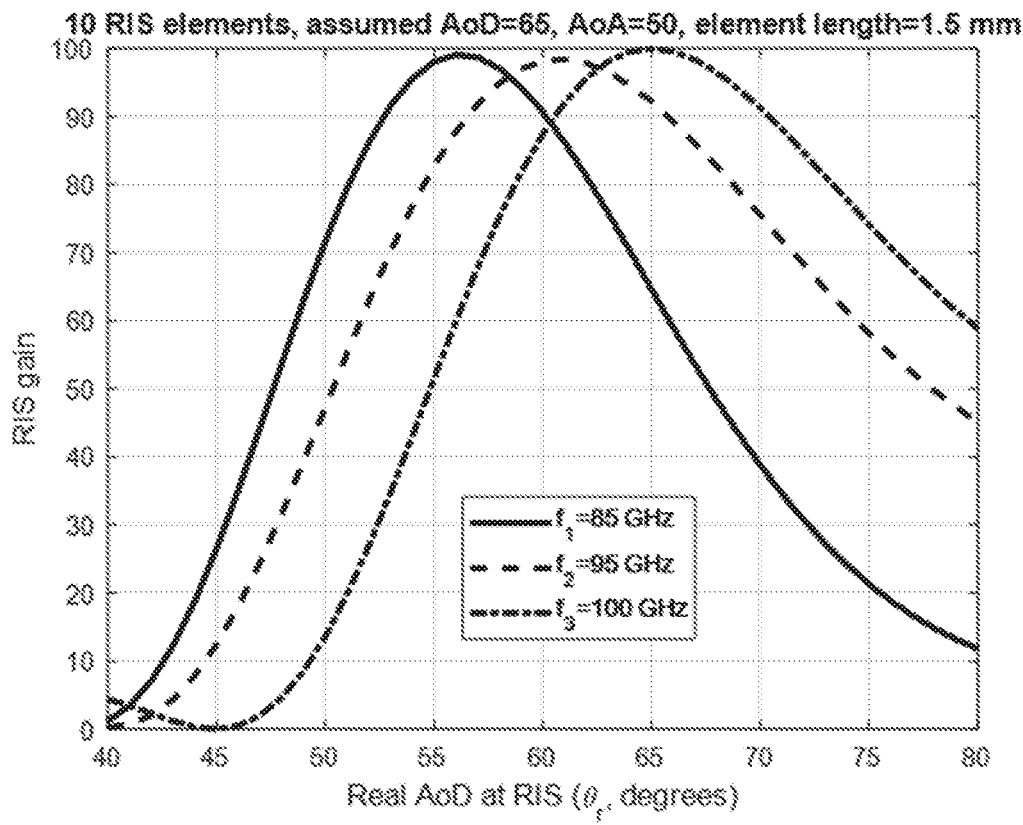
FIG. 5A is a graphical plot illustrating AoD for three different frequencies being redirected by the RIS.

To illustrate the impact of different group delays, consider a RIS design deployed in the basic channel in FIG. 1. In a particular example, a transmission has an AoA at the RIS of 50 degrees while the AoD is assumed to be 65 degrees. Furthermore, the RIS is configured to reflect or redirect an incident signal having a frequency of 100 GHz. FIG. 5A shows a graphical plot resulting from a simulation for determining a real AoD at the RIS for components of a wideband signal that is transmitted at a base station 502 having frequency components of 100 GHz, 95 GHz and 85 GHz, where the AoA is 50 degrees and the assumed AoDs for signals at those frequencies are 65 degrees, 61 degrees and 57 degrees, respectively. In this simulation the RIS 504 is 10 elements in length. It can be seen from FIG. 5A that for the frequency component at 100 GHz frequency, the normalized RIS gain is maximized when the real AoD is close to the assumed AoD. However, for other frequency components at 95 GHz and 85 GHz, the maximum gains are when the real AoD is 61 and 57 degrees, respectively, which are deviated from the assumed AoD, i.e., 65 degrees.

Figure 5B:
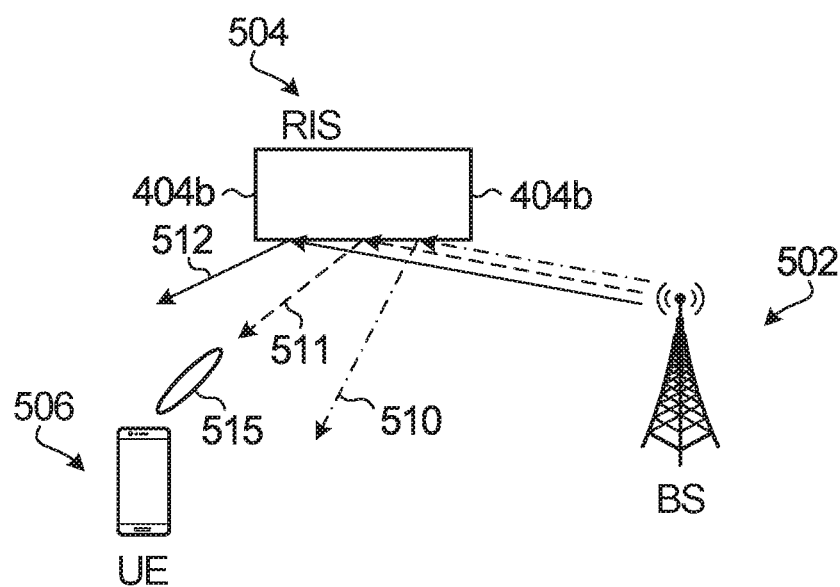
FIG. 5B is a schematic diagram illustrating a RIS configured to redirect the frequencies transmitted by the base station, as shown in FIG. 5A, in multiple different directions.
Figure 5C:
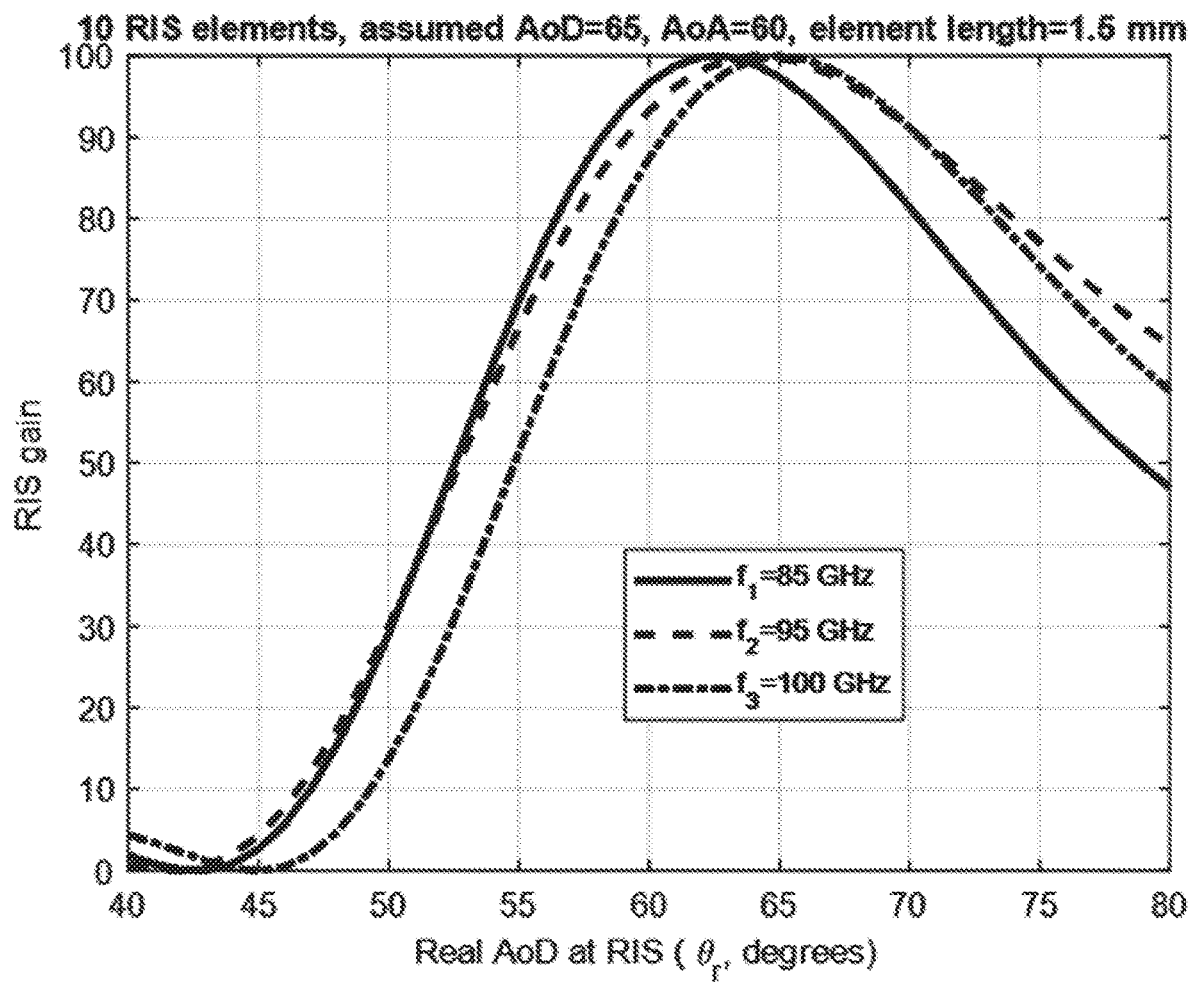
FIG. 5C is a graphical plot illustrating AoD for three different frequencies being redirected by the RIS with a different angle of arrival (AoA) resulting in the AoD range being reduced as compared to FIG. 5A.

FIG. 5B illustrates the channel between the base station 502, RIS 504 and UE 506 and shows how the three frequency components 100 GHz 510, 95 GHz 511 and 85 GHz 512 of the wideband signal have a same AoA, but different AoD from the assumed AoD as shown in FIGS. 5A and 5C. A beamsweeping beam 515 of the UE is also shown in the figure.

FIG. 5C illustrates another simulation for the same three frequencies 100 GHz, 95 GHz and 85 GHz that show that the deviation decreases as the AoA gets closer to the AoD. In the particular example of FIG. 5C, the AoA has been increased from 50 degrees in FIG. 5A to 60 degrees, and the AoD is still 65 degrees.

The impact of the prism-like effect on the RIS reflection of the incident signals of different frequencies was shown in the previous two examples. Examples of how to utilize this prism-like effect in processes of channel estimation and data transmission will now be described.

As described above, the RIS reflects signals of different frequencies (or different frequency components of a wideband signal) in different directions. Hence, some embodiments of the disclosure enable, when performing channel estimation, which may include AoD estimation of a signal redirected from the planar array of configurable elements, the planar array of configurable elements being used for simultaneous estimation of multiple AoD by appropriate selection of the frequency of the transmitted signals.

Some embodiments of the disclosure also enable a planar array of configurable elements, which can be configured with disjoint sets of voltages for different frequencies, to be utilized to serve multiple UEs, in which each UE uses a narrow band frequency. This may result in reduced interference amongst the UEs.

As discussed above, for a wideband communication including a range of frequencies, a signal reflected by a RIS appears to experience multipath fading due to different group delays of different frequencies within the wideband communication. Some embodiments of this disclosure describe how this multipath fading can be compensated for. Various embodiments are described that provide for compensation at the transmitter, the receiver, or the RIS.

It is to be noted that the terms "narrow bandwidth", "narrow band", "narrow band frequency", "narrowband frequency", and "narrow frequency band" are used alternatively to refer to a same type of signal. Similarly, the terms "wideband", "wide bandwidth", "wide frequency band" and "wideband frequency" are used alternatively to refer to a same type of signal.

For a specific RIS implementation as explained above, it is possible to consider an incident reference or data signal to the RIS as having a narrow bandwidth if the lower and upper ends of the signal's frequency band experience almost the same phase shift for a specific configuration of each RIS configurable element when the signal is redirected by the RIS. Otherwise, the signal is considered of having a wide bandwidth.

A RIS including a plurality of configurable elements can redirect the transmitted signals to multiple directions by appropriate selection of the frequencies of the transmitted signals. Selection of the frequency components to be used in the channel estimation may be carried out at a base station, or more generally elsewhere within the network, by sending commands to a controller of the RIS. For example, the base station or network may provide the RIS controller with information pertaining to frequencies of reference signals that may be used for channel estimation, the AoA at the RIS from a base station transmitting the signal based on positional information between the base station and RIS, a desired AoD from the RIS or a difference between these two values, which would allow the RIS controller to determine how to configure some or all of the elements of the RIS.

While the following embodiments describe solutions in the context of downlink channel estimation, i.e. in a direction from a base station to a UE via a RIS, it is to be understood that these solutions are extendable to channel estimation in an uplink direction, i.e. from a UE to a base station via the RIS. The solutions are further extendable to side-link communication, i.e., among two UEs via the RIS with the help of the network.

The RIS can be configured to be virtually divided into multiple portions such that each portion reflects, or redirects, signals of specific frequencies in different directions. In some embodiments the beams of the reflected signals are substantially non-overlapping. Substantially non-overlapping is intended to mean that the beams generally do not overlap, however, there may be some overlap that inevitably occurs. For example, in FIG. 4B, the reflected beams are slightly overlapping as the beams are both shown to include a beam portion in the range of 30 and 35 degrees.

In the case of substantially non-overlapping beams, the base station directs a transmission beam to the RIS that includes multiple reference signals, each of narrow bandwidth. An example of a type of reference signal that may be used is a channel state information reference signal (CSI-RSs). The reference signals that are reflected by the portions of the RIS that are configured with different bias voltage are redirected in different directions.

The base station can also configure the UE by providing the UE, via a radio resource control (RRC) configuration message, with an identification of frequencies that will be transmitted by the base station and redirected by the RIS. The UE, while beam sweeping, performs measurements of the signals at the identified frequencies. Examples of types of measurement that might be performed by the UE are measuring a reference signal received power (RSRP), a reference signal strength indicator (RSSI), a reference signal received quality (RSRQ), or a signal-to-noise ratio (SNR). The UE then feeds back an identifier that corresponds to reference signal with a strongest measurement. Note that the UE can also feed back multiple identifiers that corresponds to multiple reference signals with good measurements (e.g. equal or more than a threshold on the measurement like RSRP, RSSI, RSRQ, or SNR that is needed to satisfy a service requirement (e.g. data rate) for the UE. For example, if the reference signal is a CSI-RS, the identifier may be a CSI-RS index or CSI-RS indices.

Based on the identified index or indices, the base station is able to estimate an AoD from the RIS to the UE for a particular frequency that provides a signal having a strongest signal strength at the UE or a signal that satisfies a threshold.

Once the base station has performed channel estimation and determined an optimal AoD to be used for transmission of data to the UE, the base station can then configure the RIS for data transmission to the UE. One option is the entirety of the RIS can be configured to reflect with the desired AoD at the given transmission frequency to increase the gain to that direction. This may also enable more data to be transmitted via multiple narrowband signals, for example when using carrier aggregation. Alternatively, it may be possible to use frequency selective scheduling combined with beamforming to maximize a rate experienced at the receiver. Another option is a sufficient portion of the RIS (as opposed to the entirety of the RIS) is configured for reflection such that the received signal at the receiver (e.g. the UE) satisfies a specific requirement, e.g., data rate threshold. In this option, the remaining portion of the RIS can be utilized for other purposes, e.g., serve other UE or UEs.

Note that if the UE feeds back measurements of only one reference signal, the UE already knows on which beam (e.g. AoA at the UE) it will receive the transmission data from the base station. However, if the UE feeds back the measurements of multiple references signals, the base station, after selecting one or more of the fed back measurements to estimate the channel, may need to send back the indices of the selected reference signal used for estimation such that the UE knows on which beam (AoA(s) at the UE) to receive the transmission data from the BS.

While the preceding example included discussion of both channel estimation and data transmission, it is to be understood that these two aspects can be utilized together or each utilized independently. Some embodiments only take advantage of the prism-like effect for channel estimation while avoiding the transmitting data. Other embodiments may perform channel estimation through other methods, but perform the data transmission step using prism effect.

The number of directions to which the RIS can reflect may depend on a number of frequencies that can be independently configured to reflect in a specific direction while having minor impact on the reflected direction for the signals of other frequencies as described above pertaining to a disjoint range of applied bias voltages. If more directions need to be used, the base station can perform another transmission of the reference signals at a different time with another configuration of the planar array to reflect to the new directions. Such a process is called multi-beam sweeping.

The base station can further instruct the RIS to deploy hierarchical beamforming, i.e., the RIS reflects the base station signals to multiple directions of wide-beams. Then, from the selected direction of a wide-beam, the base station further configures the RIS to reflect multiple narrow beams with the directions pertaining to the wide beams.

The preceding example describing downlink (DL) transmission can be adapted to uplink (UL) transmission as follows. In UL, the AoD from the RIS to the base station is known given the RIS and base station locations and they are both connected to a network. The base station can configure the UE via RRC signaling to transmit different sounding reference signals (SRSs) of different frequencies on each beam or via multiple beams. Moreover, the base station can configure the RIS such that each RIS part reflects towards the base station (given the AoD) an incident signal of specific frequency assuming an AoA that is different of the signals of other frequencies. Then, while beam-sweeping, the UE transmits SRSs that (when reach the RIS) are reflected differently considering their different frequencies. The base station then performs some measurements for the received SRS. From these measurements, the base station estimates the AoA at the RIS. After that, the base station configures the RIS for a proper reflection (e.g. maximizing the gain at the base station) and feeds back the index or indices of the SRSs with good measurements and informs the UE about the transmission scheme (e.g. multiple narrow band transmission of different frequencies).

There are multiple options to adapt the preceding examples to side-link (SL) communication. Without loss of generality, SL can be considered as one UE (UE1) wanting to transmit information to another UE (UE2) with the help of the RIS. Some example embodiments are given below, but it is to be understood that other similar embodiments are also possible.

Example 1: The network or base station knows the AoA for a signal from the base station to the RIS and the AoD from the RIS to the base station. Then, the AoD from the RIS to UE2 can be estimated as DL explained in the preceding example while the AoA from UE1 to the RIS can be estimated as in the UL transmission explained earlier. Then, the base station configures the RIS for a proper reflection from UE1 to UE2 and informs UE1 and UE2 about the transmission scheme (e.g. multiple narrow band transmission of different frequencies).

Example 2: Similar to above example 1, the AoD from the RIS to UE2 can be estimated as DL explained in the preceding example. Then, for the AoA from UE1 to RIS, it can be estimated as in the UL transmission, except the base station configures the RIS to reflect UE1's reference signals to UE2. Then, UE2 performs measurements and feeds the measurements back to the base station or the base station and UE1. The base station then determines the AoA at RIS and configures the RIS to perform reflection to increase the gain of the signal from UE1 to UE2. The base station further informs UE1 about the reference signals index or indices and the transmission scheme. The base station also informs UE2 about the transmission scheme via which the two UEs can communicate.

Example 3: Briefly it is the other direction of example 2. Similar to example 1, the AoA from UE1 to the RIS can be estimated as in UL transmission explained earlier. Then, for the AoD from the RIS to UE2, it can be estimated as in the DL transmission except the base station configures the RIS to reflect UE1's reference signals to UE2. Then, UE2 performs measurements and feeds it back to the base station or the base station and UE1. The base station then determines the AoD at RIS and configures the RIS to perform proper reflection to increase the gain of the signal from UE1 to UE2. The base station further informs UE1 about the reference signals index or indices with good measurements. The base station also informs both UEs about the transmission scheme via which the two UEs can communicate.

Example 4: This example describes how to estimate the AoA to the RIS and AoD from the RIS by transmitting the reference signal among the UEs. For example, for an assume AoA at RIS from UE1 and multiple assumed AoDs to UE2, the network or base station configures the RIS to reflect the incident signals of different frequencies to different directions and configures UE1 to transmit reference signals of different frequencies. The process is repeated for different assumed AoA and AoD. Note that both UEs performs beam-sweeping. Then, UE2 feeds back measurements to the base station or both the base station and UE1. From the measurements, the base station determines the AoA and AoD. The base station further informs both UEs about the index or indices of the reference signals with good measurements. The base station further informs both UEs about the transmission scheme via which the two UEs can communicate. The method can be also performed in different ways, e.g., considering one assumed AoD and multiple assumed AoAs; or multiple assumed AoAs and multiple assumed AoDs.

In some embodiments, two or more of the beams of the signals reflected, or redirected, by the RIS overlap with one another. FIG. 5A for example shows how the reflected beams overlap substantially between 50 degrees and 75 degrees. A different channel method for overlapping reflected beams is used than the method used for non-overlapping beams.

In this method, the RIS is configured by the base station or a network device to control multiple portions with different bias voltages such that each portion of the RIS reflects a signal of a specific frequency component in a different direction.

Then, the base station directs a transmission beam to the RIS that includes several reference signals of narrow bandwidth that will be reflected in different directions by the RIS. In some embodiments, the reference signals may be CSI-RS.

The base station can also configure the UE by providing the UE, via a RRC configuration message, with an identification of frequencies that will be transmitted by the base station and redirected by the RIS. The UE, while performing beam sweeping, performs measurements, such as RSRP, RSSI, RSRQ, and/or SNR, of the received signals at the frequencies identified by the base station.

The UE feeds back identifiers of the reference signals with the strongest two or more measurements. In some embodiments, the UE may also feedback a corresponding RSRP ratio of the two strongest measurements.

Figure 6A:
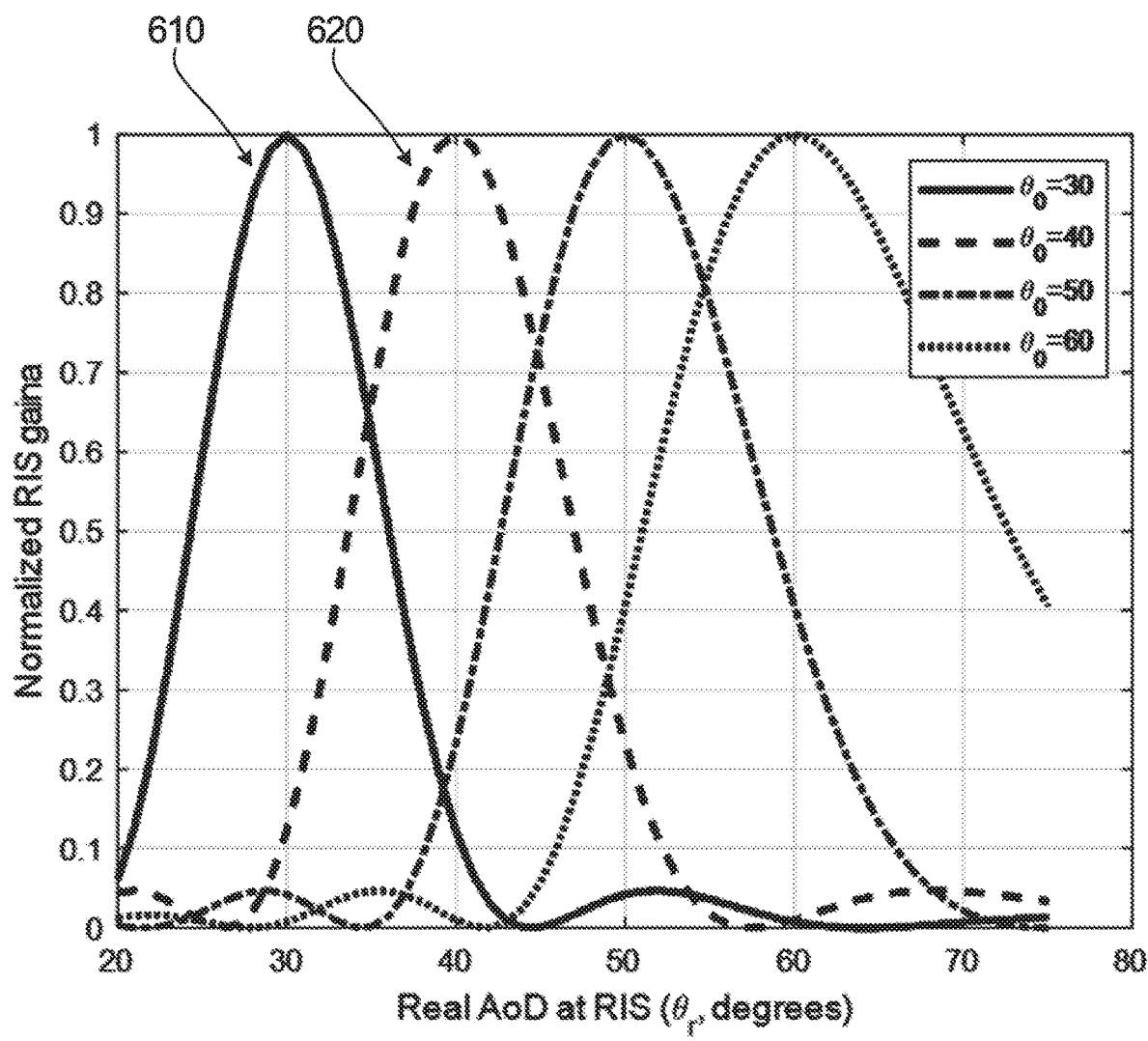
FIG. 6A is a graphical plot illustrating a normalized gain for respective AoDs for a signal being redirected by the RIS that has been portioned into four different portions, each portion configured redirect the signal with a different bias voltage.

FIG. 6A shows a simulation of the normalized gain for a channel with a linear array between the transmitter and receiver, where the linear array reflects a beam including four different frequency elements in different assumed directions based on the portions of the array being configured differently, but the reflected beams are overlapping, i.e. each beam covers part of the phase range of one or more adjacent beams. The linear RIS array described here is a single row of N configurable elements, as opposed to a two dimensional array, N×M configurable elements. As shown in FIG. 1. The linear array in the simulation is divided into four portions so that each of the four frequency components reflects in a different direction in a similar manner to FIG. 5A. This simulation is representative of the AoDs of the frequencies after being redirected by the planar array.

From the frequencies of the identified reference signal identifiers and the RSRP ratio provided to the base station by the UE, the base station is able to estimate an AoD from the linear array to the UE. For a UE that has a particular location with respect to the linear array, depending on the measured power for each given frequency component, it can be determined the proper AoD to reach the UE with good received signal power. For example, considering the respective frequency components having corresponding AoDs as shown in FIG. 6A, if the UE were to measure a maximum gain of the frequency component having the AoD of 30 degrees 610, and the other frequency components have a reduced gain, the angle of 30 degrees provides the best signal to the UE. If the normalized gains of reflected signals at 30 degrees 610 and 40 degrees 620 are approximately equal and the frequency components have a reduced gain, then an angle between 30 degrees and 40 degrees provides the best signal to the UE, and because the 30 degree and 40 degree signal gains are approximately the same it means that an AoD of 35 degrees provides the best signal to the UE.

If the base station is then going to also take advantage of the prism-like effect for data transmission, the base station configures all the portions of the planar array to reflect with the desired AoD at the given transmission frequency to increase the gain to that direction. This may also enable more data to be transmitted via multiple narrowband signals, for example when using carrier aggregation. Alternatively, it may be possible to use frequency selective scheduling combined with beamforming to maximize a rate experienced at the receiver. It is also possible to configure a sufficient portion of the RIS for reflecting to this UE while satisfying a service requirement for this UE (e.g. transmission rate). With this option, the remaining RIS portion can be utilized for other purposes (e.g. serving other UE or UEs).

Figure 6B:
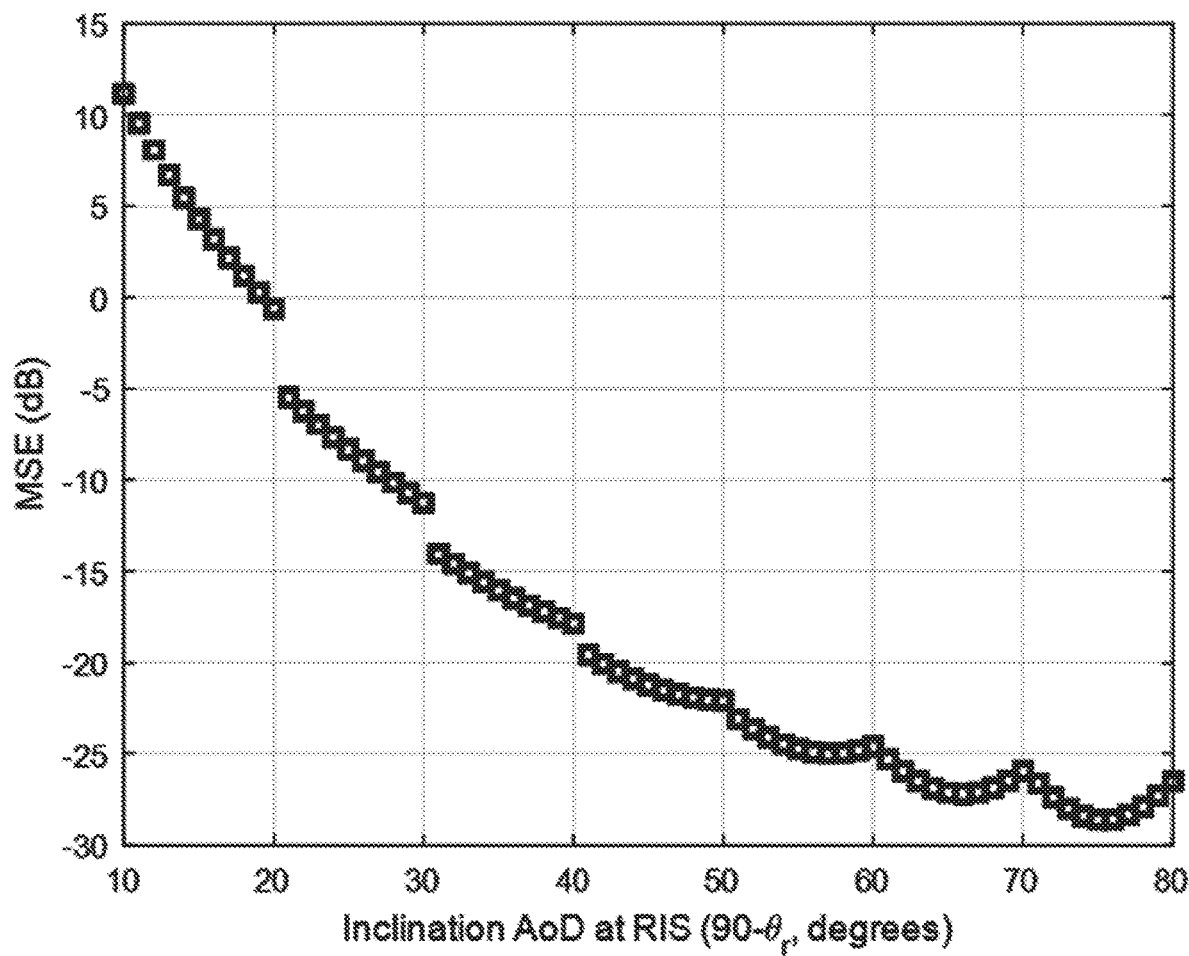
FIG. 6B is a graphical plot illustrating mean square error versus AoD estimation for a given frequency being redirected by the RIS.

FIG. 6B is a graphical plot of a simulation that shows mean square error (MSE) performance of a proposed AoD estimation at the linear RIS array plotted against inclination angle at the RIS. The inclination angle is $\pi/2-\theta r$, where $\theta r$ is the actual or real AoD. The element size is equal to $0.25\lambda^2$ where $\lambda$ is the wavelength and $L/\lambda=20$, where L is the length of the linear RIS array. The wavelength is c/f where c is the speed of light and f is a frequency that belongs to the operating range of frequencies at the RIS. The linear array is divided into K portions and the total number of elements in the linear array is N. In the simulation resulting in FIG. 6A, K=4 and N=40 and the transmitter gain $G_T$ and receiver gain $G_R$ are set equal to 0 dB. Also, in the simulation $P_t/(4\pi(D_1 D_2)^2)=0$ dB, wherein $P_t$ is the transmit power, $D_1$ is the distance between the base station and the RIS and $D_2$ is the distance between the RIS and the UE. For a panel RIS, with N×M configurable elements, wherein M=N=40, with known elevation AoD (considering the height of the transmitter (base station antenna), receiver (held by a user), the RIS are known, the elevation angle varies in a small range) and same length of L, the MSE can be improved by up to 32 dB (i.e. 10*log ($40^2$)). It is to be understood that the gain will vary based on the size of the RIS array. Note also that even if the elevation angle is unknown, it can be estimated in similar way(s) to the azimuth angle, (e.g., divide the RIS vertically into different parts and then follow similar methods described for the azimuth angle). The methods are further extendable to other two or three dimensional settings of the RIS configurable elements (e.g. circular, or hexagonal settings).

The embodiment described above pertaining to overlapping beams can be extended to UL and SL transmission in a similar way to the way that the substantially non-overlapping beam embodiment was extended to UL and SL as described above.

The two embodiments describe the transmission of relatively narrow band signals for estimation, and when desired, data transmission when taking advantage of the prism-like effect of the RIS. The narrow band signals are separated in frequency such that they are reflected independently by the planar array. However, an alternative solution is to utilize the RIS to reflect or redirect a wider bandwidth signal, which is explained below. In some embodiments, this may be particularly relevant for high frequency wider bandwidth signals.

The base station or a network device can provide configuration information to configure the planar array to reflect an incident wideband signal based on a particular frequency within the wideband signal.

Then, the base station directs a transmission beam to the planar array that includes a wideband reference signal. In some embodiments, the wideband reference signal may be a wideband CSI-RS. The particular frequency component within the wideband reference signal is reflected in a particular direction, while other frequency components in the wideband reference signal may deviate from that particular direction. This is similar to the manner that the incident narrowband reference signals of different frequencies are reflected in different directions in the examples of FIGS. 5A and 5C.

As an example, the base station sends a wide-band pilot signal (also referred to as a reference signal) that is reflected by the RIS in one assumed AoD (e.g. 30 degrees). Due to the prism-like effect or to RIS configuration, the reflected beam covers a range of 15 to 45 degrees for different frequency components in the wide-band pilot signal. Then, at another transmission time, the base station may send another pilot signal that is reflected by the RIS in a different assumed AoD (e.g. 60 degrees). Due to the prism-like effect or RIS configuration, the reflected beam covers the range of 45 to 75 degrees for all frequencies.

The base station can also configure the UE by providing the UE, via a RRC configuration message, with information about the wideband reference signal that will be transmitted by the base station and redirected by the planar array. The UE, while performing beam sweeping, performs measurements to determine a frequency response, which includes amplitude versus the frequency, phase versus the frequency or amplitude and phase versus the frequency, of the received wideband signal.

The UE feeds back an identification of one or more good (e.g. strongest or satisfying a specific RSRP or SNR threshold) reference signal component(s) of the wideband reference signal and the frequency response information based on channel measurements performed by the UE. For example, this may be an identification of a CSI-RS index, when the reference signal is a wideband CSI-RS, identifying a frequency component(s) in the wideband signal with the good signals (e.g. strongest or satisfying a specific RSRP or SNR threshold).

Based on the frequency response information and the strongest reference signal component of the wideband reference signal, the base station is able to estimate the AoD from the planar array to the UE. In some embodiments, the base station can also estimate effects of multipath fading on the channel that are caused by the prism-like effect of the planar array described above.

If the base station is then going to also take advantage of the prism-like effect for data transmission, the multipath fading can be compensated for in a number of different ways.

In some embodiments, compensation of the multipath fading can be implemented by the base station using OFDM transmission with subcarrier spacing depending on the measured frequency response.

In some embodiments, compensation of the multipath fading can be implemented by the base station configuring the planar array to reduce the deviation from the main desired direction, which corresponds to the estimated AoD. This can be done be performing one or more of:

a) using a wide beam for reflecting the data signal at the RIS that is larger than a deviation caused by a prism-like effect to avoid data loss;

b) dividing the RIS surface into smaller portions, each portion redirecting a subset of the wide frequency band data signal incident on the RIS; and c) continually optimizing the beam for the surface of the RIS pointed toward the receiver continuously for different frequencies. For example, a leftmost portion of the RIS reflects the beam for the lowest frequency in the band and moving toward right side of the RIS, the frequency for which the beam is optimized gradually increases until the rightmost part of the RIS reflects the beam for the highest frequency in the band. This may involve configuring the RIS so that different sets of one or more configurable elements of the RIS redirect a wide frequency band beam incident on the RIS in different directions from one end of the RIS to the other end of the RIS.

In some embodiments, compensation of the multipath fading can be implemented by the base station instructing the UE to perform equalization methods, such as a rake receiver, to compensate for the multipath fading caused by the planar array.

The embodiment described above pertaining to wideband signals with multiple frequency components can be extended to UL and SL transmission in a similar way as the other embodiments described above.

In the described embodiments, it is to be understood that the signaling and measurements transmitted between network nodes may take other forms than those explicitly described, for example the measurements may be functions of the measurement information.

Some potential benefits of the embodiments described above are detailed below.

In the above described embodiments, the RIS reflects, or redirects, in multiple directions, either intentionally, as in the case of the overlapping or non-overlapping beams for the narrow bandwidth reference signals, or due to deviation of the direction or certain frequency elements from the direction of a particular frequency elements of the reflected or redirected wide frequency band reference signal. Simultaneous reflection of multiple frequency elements can help speed up the sweeping process. Furthermore, for some types of materials used in the planar array, such as liquid crystal, the response time to reconfigure the orientation of the elements to reflect in another direction can be on the order of microseconds or milliseconds. A reduction in overhead used as part of the simultaneous reflection allows sufficient time to reconfigure the planar array for these types of materials. As an example, if different frequencies were transmitted sequentially over different time periods such that the RIS needed to be reconfigured for each frequency, the RIS is configured for a first direction. However, it is necessary to wait for a duration equal to the response time of the RIS to ensure that the configurable elements of the RIS have settled to the proper configuration. Once a first frequency is transmitted, the RIS is reconfigured so the RIS can reflect a second frequency in a second direction. This process is repeated eight more times. Hence, to cover all 10 frequency directions, there is a waiting time equal to 10 times the RIS response time. However, with simultaneous reflection of up to five frequencies on five directions, the additional waiting time to cover 10 directions is two response times, the first time for the first set of five frequencies and the second time for the second set of five frequencies.

For embodiments that use wideband transmission, the base station may inform the UE about the existence of the RIS in the path of the channel. This is helpful because the planar array makes the channel appear as a multipath fading channel despite that, at high frequency, the channel would be normally flat and less scattered.

As part of the functionality of channel estimation and data transmission, some signaling functionalities are used between the network and the planar array, in some cases between a network device and the planar array and in some cases between the base station and the planar array. Some signaling functionalities are also used between the base station and the UE. Some examples of new signaling that will described in further detail below includes the base station informing the UE that the RIS is being used in the channel between the base station and the UE, a mechanism for the UE to feedback frequency response information of the channel to help the base station determine the AoD at the RIS, and a signaling to enable compensation for multipath fading.

Figure 7:
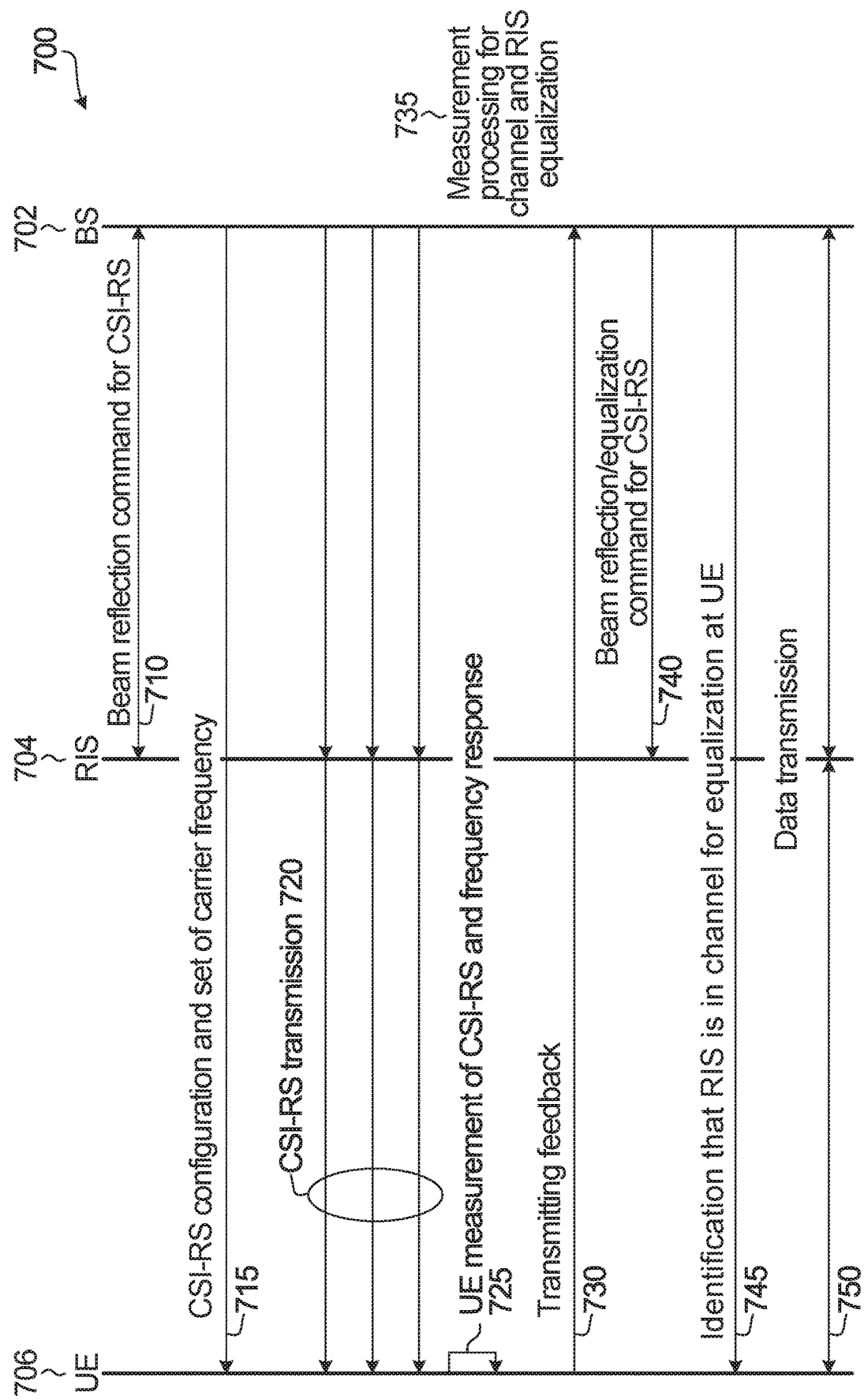
FIG. 7 is a signal flow diagram illustrating signaling between a base station, RIS and UE for configuring and data transmission for downlink according to an aspect of the application.

Some of the signaling will now be explained with help of FIG. 7 for downlink channel estimation and data transmission. FIG. 7 shows a flow diagram 700 for downlink channel estimation and data transmission involving a base station 702, planar array (labelled as RIS) 704 and UE 706. These are all elements that are part of a network, but there are also other components in the network that may perform functionality that controls how the network operates. For example, the network may provide configuration information to the planar array directly via a wired or wireless connection or the network may provide configuration information to the planar array via the base station. It should be understood that while FIG. 7 is directed to downlink channel estimation and data transmission, similar principles could be applied to implement an uplink channel estimation and data transmission.

The network may notify the base station 702 of the type of the RIS that is being used in the channel. For example, lumped elements like PIN diodes, varactors, transistors or MEMS at low frequency, liquid crystal at high frequencies and graphene at even higher frequencies. The type may refer to particular characteristics as well, such as a relation between the bias voltage, phase shift and frequency. In some embodiments, this may be identified to the base station before the events shown in FIG. 7. In some embodiments, this information might be part of configuration information sent to the base station by the RIS in step 710.

The base station 702 sends 710 configuration information to the RIS 704. The configuration information notifies the RIS 704 that the base station 702 will be transmitting a reference signal, in this example CSI-RS, in the direction of the RIS 704 that the RIS 704 will redirect to the UE 706. This configuration information helps the RIS 704 generate a hologram, which is the control information that drives the configurable elements of the RIS 704. This hologram may a set of bias voltages for the configurable elements of the RIS 704. The configuration information includes one or more of the following:
  a) the carrier frequencies of the reference signals;
  b) a difference of the phase shifts between adjacent planar array elements;
  c) an assumed one or more AoD;
  d) AoA, which may be needed especially when the planar array is sensitive to the incident angle, as in some types of liquid crystal RIS;
  e) the beam-width of the reflected signal; and
  f) identification of which portions of the planar array are configured to reflect respective reference signals.

While the base station 702 is shown sending the configuration information, as mentioned above, the configuration information may be provided to the RIS 704 by a network device other than the base station, via a wired and/or wireless connection. Also, as mentioned above, the network (when connected to the RIS) may notify the base station 702 on configuration about the RIS, as suggested by the bidirectional arrow of 710.

The base station 702 sends 715, to the UE 706, configuration information regarding the reference signals and the carrier frequencies of the reference signals for multiple narrow signals or wideband signals. In some embodiments, the configuration information may also include an identification that the RIS 704 is in the path of the communication channel because the measurement and feedback process for the channel estimation are different than if the RIS 704 is not in the path.

The base station 702 sends 720 the reference signals, which are redirected to the UE 706 by the RIS 704. While three separate transmissions are shown in the signal flow diagram of FIG. 7, it is to be understood that the reference signal transmissions may be simultaneous or at separate times. Furthermore, while three signals are shown being transmitted in FIG. 7, this is merely an example and there may be more or less than three signals being transmitted.

The UE 706 measures 725 the redirected reference signals and the UE 706 then transmits 730 feedback to the base station 702 and/or toward the RIS 704 so that the RIS 704 would reflect the feedback to the base station. For narrow band reference signals, the UE 706 measures the reference signals and feeds back information to the base station 702. For wide-band reference signals, the UE 706 measures the frequency response and feeds it back to the base station 702. In the scenario of wideband reference signals, the channel between the base station 702 and UE 706 when the RIS 704 is being used will appear similar to a multipath fading channel, which is different than a regular THz channel that comprises mainly few distinguishable paths (e.g. a line of sight (LOS) path and one or two other paths). The UE 706 may measure the RSRP or the RSSI of two or more of the reference signals or the ratio of two RSRP or the RSSI. The UE 706 sends 730 the feedback to the base station 702 via different methods including, but not limited to, the following:
  a direct link that was previously known between the UE 706 and base station 702 and that has acceptable quality;
  a reflected link via the RIS 704, which is known from a previous "connection" to be of acceptable quality;
  a direct link to the base station 702 on a different frequency band, such as a microwave band; and
  different radio access technology (RAT) mechanisms like Bluetooth or Zigbee.

The base station 702 receives the information sent from the UE 706 and performs processing 735 to estimate the channel. This may include the base station 702 determining the AoD for the reference signal at the RIS based on the received information. This may include the base station 702 determining, based on the signal measurements received from the UE 706, the portion of the configurable element that redirects the reference signals of a given frequency in the given direction. The base station 702 can then determine, based on the frequency that will be used to transmit data to the UE 706 via the RIS 704, the configuration information that is to be transmitted to the RIS 704 to result in a desired AoD from the RIS 704. The estimate of the channel, which may include, but is not limited to, the desired AoD from the RIS for a data transmission to be transmitted by the base station and redirected by the RIS for a particular carrier frequency may generally be referred to as channel information.

The base station 702 then sends 740 the configuration information to the RIS 704 to configure the RIS 704 so that data transmitted by the base station 702 for the UE 706 will be redirected by the RIS 704 in an appropriate manner. The configuration information sent to the RIS 704 may also aid in compensating the multipath effect caused by the prism-like effect of the RIS 704. For example, in some embodiments the RIS 704 may be configured such that the RIS 704 reflects a wideband signal to the UE 706 with less deviation from the desired AoD. The RIS 704 generates a hologram that includes the bias control information based on the configuration information received from the base station 702.

The base station 702 also sends 745 an identification that the RIS 704 will be used in the channel of the downlink data communication, which informs the UE 706 to perform some kind of channel equalization to compensate for the multipath fading of the channel due to the prism-like effect of the RIS 704. This allows the UE 706 to distinguish methods of equalization for transmissions received directly from the base station and transmissions received that have been redirected from the RIS 704.

The base station 702 and the UE 706 transmit and receive 750 data over the channel via the RIS 704. The base station 702 can use a particular waveform, e.g., orthogonal frequency division multiplexed (OFDM) transmission with a particular subcarrier spacing to mitigate the multipath fading of the channel.

Figure 8:
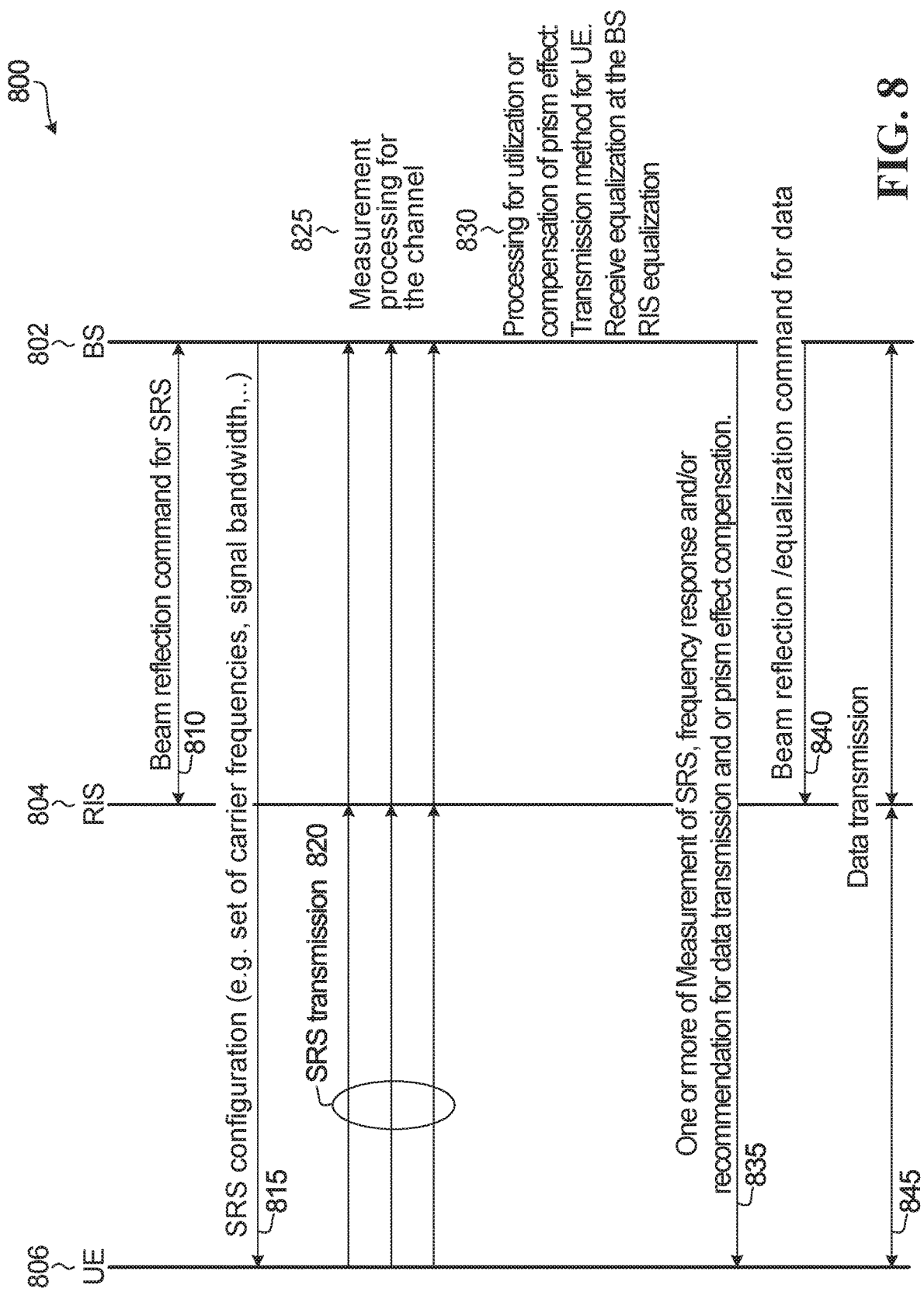
FIG. 8 is a signal flow diagram illustrating signaling between a base station, RIS and UE for configuring and data transmission for uplink according to an aspect of the application.

An addition example of the signaling will now be explained with help of FIG. 8 for uplink channel estimation and data transmission. FIG. 8 shows a flow diagram 800 for downlink channel estimation and data transmission involving a base station 802, planar array (labelled as RIS) 804 and UE 806. These are all elements that are part of a network, but there are also other components in the network that may perform functionality that controls how the network operates. For example, the network may provide configuration information to the planar array directly via a wired or wireless connection or the network may provide configuration information to the planar array via the base station. It should be understood that while FIG. 8 is directed to downlink channel estimation and data transmission, similar principles could be applied to implement an uplink channel estimation and data transmission.

The network may notify the base station 802 of the type of the RIS that is being used in the channel. For example, lumped elements like PIN diodes, varactors, transistors or MEMS at low frequency, liquid crystal at high frequencies and graphene at even higher frequencies. The type may refer to particular characteristics as well, such as a relation between the bias voltage, phase shift and frequency. In some embodiments, this may be identified to the base station before the events shown in FIG. 8. In some embodiments, this information might be part of configuration information sent to the base station by the RIS in step 810.

The base station 802 sends 810 configuration information to the RIS 804. The configuration information notifies the RIS 804 that the UE 806 will be transmitting a reference signal, in this example SRS, in the direction of the RIS 804 that the RIS 804 will redirect to the base station 802. This configuration information helps the RIS 804 generate a hologram, which is the control information that drives the configurable elements of the RIS 804. This hologram may a set of bias voltages for the configurable elements of the RIS 804. The configuration information includes one or more of the following:
  a) the carrier frequencies of the reference signals;
  b) a difference of the phase shifts between adjacent planar array elements;
  c) an assumed one or more AoAs;
  d) AoD;
  e) the beam-width of the reflected signal; and
  f) identification of which portions of the planar array are configured to reflect respective reference signals.

While the base station 802 is shown sending the configuration information, as mentioned above, the configuration information may be provided to the RIS 804 by a network device other than the base station, via a wired and/or wireless connection. Also, as mentioned above, the network (when connected to the RIS) may notify the base station 802 on configuration about the RIS, as suggested by the bidirectional arrow of 810.

The base station 802 sends 815, to the UE 806, configuration information regarding the reference signals and the carrier frequencies of the reference signals for multiple narrow signals or wideband signals. In some embodiments, the configuration information may also include an identification that the RIS 804 is in the path of the communication channel because the measurement and feedback process for the channel estimation are different than if the RIS 804 is not in the path.

The UE 806 sends 820 the reference signals, which are redirected to the base station 802 by the RIS 804. While three separate transmissions are shown in the signal flow diagram of FIG. 8, it is to be understood that the reference signal transmissions may be simultaneous or at separate times. Furthermore, while three signals are shown being transmitted in FIG. 8, this is merely an example and there may be more or less than three signals being transmitted.

The base station 802 measures 825 the redirected reference signals. For narrow band reference signals, the base station 802 measures the reference signals. For wide-band reference signals, the base station 802 measures the frequency response. In the scenario of wideband reference signals, the channel between the base station 802 and UE 806 when the RIS 804 is being used will appear similar to a multipath fading channel, which is different than a regular THz channel that consists mainly of few distinguishable paths (e.g. LoS path and one or two other paths). The base station 802 may measure the RSRP or the RSSI of two or more of the reference signals or the ratio of two RSRP or the RSSI.

The base station 802 performs processing 830 to estimate the channel based on utilization of the prism-like effect. This may include the base station 802 determining the AoA for the reference signal at the RIS based on the received information. This may include the base station 802 determining, based on the signal measurements, the portion of the configurable element that redirects the reference signals of a given frequency in the given direction. The base station 802 can then determine, based on the frequency that will be used to receive data from the UE 806 via the RIS 804, the configuration information that is to be transmitted to the RIS 804 to result in a desired AoA at the RIS 804 from the UE 806. The processing 830 may also involve determining compensation for the prism-like effect, determining a transmission method for the UE, including configuration information that may be needed to send to the UE to implement the transmission method. The estimate of the channel, which may include, but is not limited to, the desired AoA from the RIS for a data transmission to be transmitted by the UE and be redirected by the RIS for a particular carrier frequency may generally be referred to as channel information.

The base station 802 also sends 835 to the UE 806 one or more of: measurements of the SRS made by the base station 802, frequency response, configuration information to be used by the UE for data transmission. The base station 802 also sends 835 prism-like effect compensation configuration information to compensate for the multipath fading of the channel due to the prism-like effect of the RIS 804.

The base station 802 then sends 840 the configuration information to the RIS 804 to configure the RIS 804 so that data transmitted by the UE 806 to the base station 802 will be redirected by the RIS 804 in an appropriate manner. The configuration information may include information, such as, but not limited to a determined AOD from the RIS 804 to the UE 802 for a data transmission on a particular carrier frequency, that enables the RIS to generate an appropriate hologram for the configurable elements of the RIS to redirect the data transmission in the direction that it will reach the UE 806. The configuration information sent to the RIS 804 may also aid in compensating the multipath effect caused by the prism-like effect of the RIS 804. For example, in some embodiments the RIS 804 may be configured such that the RIS 804 reflects a wideband signal to the base station 802 with less deviation from the desired AoA. The RIS 804 generates a hologram that includes the bias control information based on the configuration information received from the base station 802.

The UE 806 and the base station 802 transmit and receive 845 data over the channel via the RIS 804. The UE 806 can use a particular waveform, e.g., OFDM transmission with a particular subcarrier spacing to mitigate the multipath fading of the channel.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
   transmitting first configuration information to a user equipment (UE), the first configuration information identifying both a reference signal and a carrier frequency of the reference signal, the reference signal and the carrier frequency being used to determine channel information about a channel between a base station and the UE via a reconfigurable intelligent surface (RIS);
   transmitting a reference signal that is to be redirected by the RIS based on second configuration information, wherein the second configuration information configures the RIS to redirect different frequency components of the reference signal in different directions;
   receiving measurement information from the UE pertaining to measurement of the redirected reference signal; and
   determining the channel information based on the transmitted reference signal and the received measurement information.

2. The method of claim 1 further comprising at least one of:
   transmitting a data transmission in a direction toward the RIS, the data transmission redirected by the RIS to the UE; or
   receiving a data transmission from the UE, the data transmission redirected by the RIS before being received.

3. The method of claim 2 further comprising:
   compensating for a multipath fading effect resulting from frequency components in a wide frequency band data signal occupying a range of frequencies being redirected in different directions by the RIS, the compensating by at least one of:
   using orthogonal frequency division multiplexing (OFDM) for the data transmission with a subcarrier spacing depending on a measured frequency response of the wide frequency band data signal interacting with the RIS;
   configuring the RIS to reduce a deviation from a main desired direction; or
   transmitting an indication that the UE is to perform channel equalization.

4. The method of claim 3, further comprises transmitting third configuration information to the RIS to configure the RIS to redirect a data transmission in an appropriate direction when the data transmission interacts with the RIS, wherein configuring the RIS to reduce the deviation from the main desired direction comprises configuring the RIS with the third configuration information comprising configuration information for at least one of:
   configuring the RIS to redirect with a wide frequency band data signal transmitted in a wide beam that is larger than a deviation caused by a prism-like effect;
   configuring the RIS to divide the RIS into separate portions, each portion redirecting a subset of the wide frequency band data signal incident on the RIS; or
   configuring the RIS so that different sets of one or more configurable elements of the RIS redirect the wide frequency band data signal incident on the RIS in a desired direction by having the configurable elements on one end of the RIS configured to redirect a lowest frequency component of the wide frequency band data signal in the desired direction and then configuration of other configurable elements of the RIS gradually changes such that at the other end of the RIS, the configurable elements are configured to redirect a highest frequency of the wide frequency band data signal in the desired direction.

5. The method of claim 1, wherein transmitting a reference signal comprises transmitting at least one of:
   one or more narrow frequency band reference signals that are to be redirected by the RIS in different directions such that redirected beams from the RIS are substantially non-overlapping;
   one or more narrow frequency band reference signals that are to be redirected by the RIS in different directions such that redirected beams from the RIS are overlapping; or
   a wide frequency band reference signal wherein frequency components of the wide frequency band reference signal are to be redirected by the RIS in different directions due to a prism-like effect of the RIS.

6. The method of claim 1, wherein receiving measurement information from the UE comprises receiving at least one of:
   an identification of one or more reference signals with a received reference signal strength that satisfies a minimum threshold, wherein the received reference signal strength is one of:
   a reference signal received power (RSRP) for the one or more reference signals;
   a reference signal strength indicator (RSSI) for the one or more reference signals;
   a reference signal received quality (RSRQ) for the one or more reference signals; and a signal-to-noise ratio (SNR) for one or more reference signals; or a frequency response of a received wide frequency band reference signal.

7. The method of claim 1, wherein transmitting the first configuration information comprises transmitting one or more of:
   an indication that the RIS is being used to redirect signaling to the UE;
   an indication of a type of RIS being used to redirect signaling to the UE;
   an identification of carrier frequencies that the reference signals are transmitted on; or
   an identification of bandwidth of the reference signals.

8. The method of claim 1 further comprising transmitting the second configuration information to the RIS, wherein transmitting the second configuration information comprises transmitting one or more of:
   carrier frequencies that the reference signals are transmitted on;
   an angle of arrival (AoA) of the reference signal at the RIS;
   an assumed one or more angle of departure (AoDs) of the reference signal from the RIS when the reference signal is redirected;
   beam-width of the redirected signal; or
   partitioning of the RIS to redirect reference signals of different frequencies.

9. An apparatus comprising:
   a processor; and
   a computer-readable medium having stored thereon computer executable instructions that when executed cause the processor to:
      transmit first configuration information to a user equipment (UE), the first configuration information identifying both a reference signal and a carrier frequency of the reference signal, the reference signal and the carrier frequency being used to determine channel information about a channel between a base station and the UE via a reconfigurable intelligent surface (RIS);
      transmit a reference signal that is to be redirected by the RIS based on second configuration information, wherein the second configuration information configures the RIS to redirect different frequency components of the reference signal in different directions;
      receive measurement information from the UE pertaining to measurement of the redirected reference signal; and
      determine the channel information based on the transmitted reference signal and the received measurement information.

10. The apparatus of claim 9, wherein the processor is further caused to perform at least one of:
   transmitting a data transmission in a direction toward the RIS, the data transmission redirected by the RIS to the UE; or
   receiving a data transmission from the UE, the data transmission redirected by the RIS before being received.

11. The apparatus of claim 9, wherein the processor is caused to transmit at least one of:
   one or more narrow frequency band reference signals that are to be redirected by the RIS in different directions such that redirected beams from the RIS are substantially non-overlapping;
   one or more narrow frequency band reference signals that are to be redirected by the RIS in different directions such that redirected beams from the RIS are overlapping; or
   a wide frequency band reference signal wherein frequency components of the wide frequency band reference signal are to be redirected by the RIS in different directions due to a prism-like effect of the RIS.

12. An apparatus comprising:
   a processor; and
   a computer-readable medium having stored thereon computer executable instructions that when executed cause the processor to:
      receive first configuration information, the first configuration information identifying both a reference signal and a carrier frequency of the reference signal, the reference signal and the carrier frequency being used to determine channel information about a channel between a base station and the apparatus via a reconfigurable intelligent surface (RIS);
      receive a reference signal that has been redirected by the RIS based on second configuration information, wherein the second configuration information configures the RIS to redirect different frequency components of the reference signal in different directions;
      measure the received reference signal; and
      transmit measurement information pertaining to measurement of the received reference signal.

13. The apparatus of claim 12, wherein the processor is further caused to receive a data transmission that has been redirected by the RIS.

14. The apparatus of claim 13, wherein the processor is further caused to compensate for a multipath fading effect resulting from frequency components in a wide frequency band data signal occupying a range of frequencies being redirected in different directions by the RIS by receiving an indication to perform channel equalization to compensate for the multipath fading effect.

15. The apparatus of claim 12, wherein the reference signal comprises at least one of:
   one or more narrow frequency band reference signals that are redirected by the RIS in different directions such that redirected beams from the RIS are substantially non-overlapping;
   one or more narrow frequency band reference signals that are redirected by the RIS in different directions such that redirected beams from the RIS are overlapping; or
   a wide frequency band reference signal wherein frequency components of the wide frequency band reference signal are redirected by the RIS in different directions due to a prism-like effect of the RIS.

16. The apparatus of claim 12, wherein the processor is caused to measure at least one of:
   a frequency response of a received wide frequency band reference signal;
   reference signal received power (RSRP) for one or more reference signals;
   reference signal strength indicator (RSSI) for one or more reference signals;
   reference signal received quality (RSRQ) for one or more reference signals; or
   signal-to-noise ratio (SNR) for one or more reference signals.

17. The apparatus of claim 12, wherein the processor is caused to transmit at least one of:
- an identification of one or more reference signals with a received reference signal strength that satisfies a minimum threshold;
- a measurement of a reference signal received power (RSRP) for the one or more reference signals;
- a measurement of a reference signal strength indicator (RSSI) for the one or more reference signals;
- a measurement of a reference signal received quality (RSRQ) for the one or more reference signals;
- a measurement of a signal to noise ratio (SNR) for the one or more reference signals; or
- a frequency response of a received wide frequency band reference signal.

18. The apparatus of claim 12, wherein the first configuration information comprises one or more of:
- an indication that the RIS is being used to redirect signaling to the apparatus;
- an indication of the type of RIS being used to redirect signaling to the apparatus;
- an identification of carrier frequencies that the reference signal is transmitted on; or
- an identification of the bandwidth of the reference signal.

19. A method comprising:
- receiving, by a user equipment (UE), first configuration information from a base station, the first configuration information identifying both a reference signal and a carrier frequency of the reference signal, the reference signal and the carrier frequency being used to determine channel information about a channel between the base station and the UE via a reconfigurable intelligent surface (RIS);
- receiving, by the UE, a reference signal that is redirected by the RIS based on second configuration information, wherein the second configuration information configures the RIS to redirect different frequency components of the reference signal in different directions;
- measuring the received reference signal; and
- transmitting, by the UE, measurement information by the UE pertaining to measurement of the redirected reference signal.

20. The method of claim 19, wherein receiving a reference signal comprises receiving at least one of:
- one or more narrow frequency band reference signals that are redirected by the RIS in different directions such that redirected beams from the RIS are substantially non-overlapping;
- one or more narrow frequency band reference signals that are redirected by the RIS in different directions such that redirected beams from the RIS are overlapping; or
- a wide frequency band reference signal wherein frequency components of the wide frequency band reference signal are redirected by the RIS in different directions due to a prism-like effect of the RIS.

21. The method of claim 19, further comprising:
measuring, by the UE, at least one of:
- a frequency response of a received wide frequency band reference signal;
- reference signal received power (RSRP) for one or more reference signals;
- reference signal strength indicator (RSSI) for one or more reference signals;
- reference signal received quality (RSRQ) for one or more reference signals; or
- signal-to-noise ratio (SNR) for one or more reference signals; and transmitting, by the UE, at least one of:
- an identification of one or more reference signals with a received reference signal strength that satisfies a minimum threshold;
- a measurement of the RSRP for the one or more reference signals;
- a measurement of the RSSI for the one or more reference signals;
- a measurement of the RSRQ for the one or more reference signals;
- a measurement of a SNR for the one or more reference signals; or
- the frequency response of a received wide frequency band reference signal.

22. The method of claim 19, wherein receiving the first configuration information comprises receiving one or more of:
- an indication that the RIS is being used to redirect signaling to the UE;
- an indication of a type of RIS being used to redirect signaling to the UE;
- an identification of carrier frequencies that the reference signals are transmitted on; or
- an identification of bandwidth of the reference signals.

* * * * *